(12) United States Patent
Miyafuji et al.

(10) Patent No.: US 8,901,255 B2
(45) Date of Patent: Dec. 2, 2014

(54) CURABLE COMPOSITION

(75) Inventors: Kiyoshi Miyafuji, Takasago (JP);
Toyohisa Fujimoto, Takasago (JP);
Katsuyu Wakabayashi, Takasago (JP);
Toshihiko Okamoto, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/816,346

(22) PCT Filed: Aug. 5, 2011

(86) PCT No.: PCT/JP2011/004464
§ 371 (c)(1),
(2), (4) Date: Apr. 11, 2013

(87) PCT Pub. No.: WO2012/020560
PCT Pub. Date: Feb. 16, 2012

(65) Prior Publication Data
US 2013/0217828 A1   Aug. 22, 2013

(30) Foreign Application Priority Data

Aug. 10, 2010   (JP) .................. 2010-179570
Oct. 13, 2010   (JP) .................. 2010-230719
Oct. 13, 2010   (JP) .................. 2010-230720
Oct. 13, 2010   (JP) .................. 2010-230721

(51) Int. Cl.
| | | |
|---|---|---|
| C08L 71/02 | (2006.01) |
| C08F 220/10 | (2006.01) |
| C09J 171/02 | (2006.01) |
| C08L 43/04 | (2006.01) |
| C09J 143/04 | (2006.01) |
| C09K 3/10 | (2006.01) |
| C08G 65/336 | (2006.01) |

(52) U.S. Cl.
CPC .......... *C08L 71/02* (2013.01); *C09K 2200/0657* (2013.01); *C09K 2200/0625* (2013.01); *C09J 171/02* (2013.01); *C08L 43/04* (2013.01); *C09J 143/04* (2013.01); *C09K 3/10* (2013.01); *C08G 65/336* (2013.01)
USPC ............ 525/529; 525/477; 528/18; 528/21

(58) Field of Classification Search
None
See application file for complete search history.

(56) References Cited

U.S. PATENT DOCUMENTS

| | | | | |
|---|---|---|---|---|
| 7,153,923 | B2 * | 12/2006 | Schindler et al. ............... | 528/35 |
| 2007/0203297 | A1 * | 8/2007 | Wakabayashi et al. ....... | 525/187 |
| 2008/0125539 | A1 * | 5/2008 | Mack ............................ | 524/588 |
| 2009/0247712 | A1 | 10/2009 | Tanaka et al. | |
| 2010/0216925 | A1 * | 8/2010 | Yano ............................ | 524/178 |
| 2011/0098410 | A1 | 4/2011 | Harumashi et al. | |
| 2011/0123799 | A1 * | 5/2011 | Yasui et al. ................... | 428/354 |

FOREIGN PATENT DOCUMENTS

| | | |
|---|---|---|
| CN | 101535374 A | 9/2009 |
| JP | 8-134203 A | 5/1996 |
| JP | 2005-501146 A | 1/2005 |
| JP | 2008-163141 A | 7/2008 |
| JP | 2008-239809 A | 10/2008 |
| JP | 2009-529581 A | 8/2009 |
| JP | 2010-150381 A | 7/2010 |
| WO | 2008/053875 A1 | 5/2008 |
| WO | 2009/133811 A1 | 11/2009 |

OTHER PUBLICATIONS

Translation of the International Preliminary Report on Patentability (PCT/ISA/237) (5 pages), (PCT/IB/373) (1 page) of International Application No. PCT/JP2011/00464, issued Mar. 12, 2013.
International Search Report for PCT/JP2011/004464, mailing date of Nov. 8, 2011.

* cited by examiner

*Primary Examiner* — Marc Zimmer
(74) *Attorney, Agent, or Firm* — Westerman, Hattori, Daniels & Adrian, LLP

(57) ABSTRACT

An object of the present invention is to provide a curable composition that can be used as sealing materials, adhesives, and the like, has excellent curing properties, and gives a cured product excellent in elongation properties. The object can be attained by means of a curable composition comprising: a reactive silyl group-containing polyether polymer (A) that contains a reactive silyl group with high activity (e.g., $(ClCH_2)(CH_3O)_2Si-$, $(CH_3OCH_2)(CH_3O)_2Si-$, or $CH_3(CH_3O)_2Si-CH_2-NH-C(=O)-$); and a reactive silyl group-containing polyether polymer (B) that contains a reactive silyl group (e.g., $CH_3(CH_3O)_2Si-$ or $(CH_3O)_3Si-$) different from that mentioned above and/or a (meth)acrylic polymer (C) containing a reactive silyl group that is not particularly limited.

16 Claims, No Drawings

CURABLE COMPOSITION

TECHNICAL FIELD

The present invention relates to an organic polymer containing a silicon-containing group which contains a hydroxy or hydrolyzable group bonded to a silicon atom and can form a siloxane bond to be cross-linked (hereinafter referred to also as a "reactive silyl group"), and a curable composition comprising the organic polymer.

BACKGROUND ART

An organic polymer having at least one reactive silyl group per molecule is known to have a characteristic that it is cross-linked by siloxane bond formation involving hydrolysis or other reactions of the silyl group due to factors such as moisture even at room temperature, whereby a rubbery cured product is obtained.

Among such polymers, polymers containing an alkyldialkoxysilyl group are known to offer excellent, flexible and tough cured products and are widely used in applications such as sealants, adhesives, and coating agents. Curable compositions containing these organic polymers are usually cured by means of a condensation catalyst such as a dibutyltin compound. In the case that such a curable composition needs to be cured in a short time, generally, for example, the amount of condensation catalyst is increased. However, the toxicity of organotin compounds has been pointed out in recent years, and these compounds must be used with care from the viewpoint of environmental safety.

Although polymers having a trialkoxysilyl group at both terminals have high curability, the resulting cured products are known to be hard and brittle. In the case of using these polymers for contact adhesives, the crosslink density becomes too high during curing, which causes the problem that the length of time until tack development (i.e., so-called open time) cannot be long.

Meanwhile, it has been suggested that the use of a polymer having a specific terminal structure, although terminated with a dialkoxysilyl group, can provide a curable composition having a high curing rate (Patent Literature 1 and Patent Literature 2). In some cases, however, the curable compositions prepared from the polymers described in Patent Literatures 1 and 2 give cured products having poor tensile properties.

CITATION LIST

Patent Literature

Patent Literature 1: JP-T 2005-501146
Patent Literature 2: WO2008/053875

SUMMARY OF INVENTION

Technical Problem

Use of the polymers proposed by Patent Literature 1 and Patent Literature 2 can provide curable compositions having high curability, even if, for example, an amine compound is used as the condensation catalyst. Depending on applications, however, elongation properties may be required. Thus, these curable compositions still leave room for improvement in terms of obtaining both elongation properties and curability.

An object of the present invention is to provide a curable composition that has excellent elongation properties and rapid curability even when a non-organotin condensation catalyst is used, and has a long tack time when used as a contact adhesive.

Another object of the present invention is to provide a curable composition that has a curing rate as rapid as the curability of the polymers described in the aforementioned patent literatures without impairing the elongation properties of a polymer containing an alkyldialkoxysilyl group, and has a long tack time.

Solution to Problem

As a result of eager studies to solve the problems, the present inventors have found that the use of an organic polymer (A) containing a reactive silyl group having a specific structure, together with a reactive silyl group-containing polyether polymer (B) and/or a reactive silyl group-containing (meth)acrylic polymer (C) makes it possible to achieve both excellent elongation properties and initial tack properties without impairing the rapid curability of the polymer (A). Based on the findings, the present invention has been completed.

Specifically, the present invention is directed to:

(1) a curable composition, comprising:

a polyether polymer (A) containing a reactive silyl group represented by the following formula (1); and at least one of a polyether polymer (B) containing a reactive silyl group represented by the following formula (2), and a (meth)acrylic polymer (C) containing a reactive silyl group represented by the following formula (3):

$$-W-CH_2-SiR^1_a R^2_b X_c \qquad (1)$$

wherein $R^1$ is a C1 to C20 hydrocarbon group wherein at least one hydrogen atom on carbon atoms at positions 1 to 3 is replaced with halogen, $-OR^3$, $-NR^4R^5$, $-N=R^6$, $-SR^7$ (in which each of $R^3$, $R^4$, $R^5$, and $R^7$ is a hydrogen atom or a C1 to C20 substituted or unsubstituted hydrocarbon group, and $R^6$ is a divalent C1 to C20 substituted or unsubstituted hydrocarbon group), a C1 to C20 perfluoroalkyl group, or a cyano group; $R^2$ represents a C1 to C20 hydrocarbon group, a C6 to C20 aryl group, a C7 to C20 aralkyl group, or a triorganosiloxy group represented by $R^0{}_3SiO-$ wherein each of three $R^0$s is a C1 to C20 hydrocarbon group and they may be the same as or different from each other; X represents a hydroxy or hydrolyzable group; W represents a linking group selected from $-O-R^8-$, $-O-CO-N(R^9)-$, $-N(R^9)-CO-O-$, $-N(R^9)-CO-N(R^9)-$, $-S-CO-NH-$, $-NH-CO-S-$, and $-S-$ wherein $R^8$ represents a divalent C1 to C8 hydrocarbon group, and $R^9$ represents hydrogen or a C1 to C18 hydrocarbon group optionally substituted with halogen; in the case that W is $-O-R^8-$, a is 1 or 2, b is 0 or 1, and c is 1 or 2, provided that a+b+c=3 is satisfied; in the case that W is a group other than $-O-R^8-$, a is 0, 1, or 2, b is 0, 1, or 2, and c is 1, 2, or 3, provided that a+b+c=3 is satisfied; and in the case that a plurality of $R^1$s, $R^2$s, or Xs exist, they may be the same as or different from each other, $$-V-SiR^2_d X_{3-d} \qquad (2)$$

wherein $R^2$ and X are defined as mentioned in formula (1); V represents a divalent C2 to C8 hydrocarbon group; d represents any of 0, 1, and 2; and in the case that a plurality of $R^2$s or Xs exist, they may be the same as or different from each other, and $$-Z-(CH_2)_n-SiR^1_a R^2_b X_c \qquad (3)$$

wherein $R^1$, $R^2$, and X are defined as mentioned in formula (1); Z represents a linking group selected from $-CO-O-$, —O—CO—N(R$^9$)—, —N(R$^9$)—CO—O—, —N(R$^9$)—CO—N(R$^9$)—, —S—CO—NH—, —NH—CO—S—, and —S— wherein R$^9$ is defined as mentioned in formula (1); n represents a number of 1 to 8; a is 0, 1, or 2, b is 0, 1, or 2, and c is 1, 2, or 3, provided that the condition: a+b+c=3 is satisfied; and in the case that a plurality of R$^1$s, R$^2$s, or Xs exist, they may be the same as or different from each other;

(2) the curable composition according to (1),
wherein R$^1$ in formula (1) is an organic group represented by the following formula (4):

wherein Y is a group selected from halogen, —OR$^3$, —NR$^4$R$^5$, —N=R$^6$, —SR$^7$ (in which each of R$^3$, R$^4$, R$^5$, and R$^7$ is a hydrogen atom or a C1 to C20 substituted or unsubstituted hydrocarbon group, and R$^6$ is a divalent C1 to C20 substituted or unsubstituted hydrocarbon group), a C1 to C20 perfluoroalkyl group, and a cyano group; R$^{10}$ represents a hydrogen atom or a C1 to C19 alkyl group; e represents 1, 2, or 3; and in the case that a plurality of Ys or R$^{10}$s exist, they may be the same as or different from each other;

(3) the curable composition according to (2),
wherein Y in formula (4) is chlorine;
(4) the curable composition according to (2),
wherein the group represented by formula (4) is a chloromethyl group;
(5) the curable composition according to (2),
wherein Y in formula (4) is an alkoxy group;
(6) the curable composition according to (2),
wherein Y in formula (4) is at least one group selected from the group consisting of a methoxy group, an ethoxy group, and a phenoxy group;
(7) the curable composition according to (2),
wherein the group represented by formula (4) is a methoxymethyl group;
(8) the curable composition according to any one of (1) to (7),
wherein W in formula (1) is —O—R$^8$— in which R$^8$ is a divalent C1 to C8 hydrocarbon group;
(9) the curable composition according to any one of (1) to (8),
wherein the polyether polymer (A) is a polyoxypropylene polymer;
(10) the curable composition according to any one of (1) to (9),
wherein the polyether polymer (A) is a linear polymer having no branch;
(11) the curable composition according to any one of (1) to (10),
wherein a backbone structure of the polyether polymer (B) is a polyoxypropylene polymer;
(12) the curable composition according to any one of (1) to (11),
wherein the reactive silyl group of formula (2) is a dimethoxymethylsilyl group;
(13) the curable composition according to any one of (1) to (12),
wherein the (meth)acrylic polymer (C) is at least one of a reactive silyl group-containing alkyl(meth)acrylate polymer and copolymer;
(14) the curable composition according to (1) to (13),
which comprises the polyether polymer (A), the polyether polymer (B), and the (meth)acrylic polymer (C);
(15) the curable composition according to (1) to (14),
wherein the polyether polymer (A) has a number average molecular weight of 22,000 or higher;

(16) the curable composition according to any one of (1) to (15),
wherein the polyether polymer (A) and the polyether polymer (B) are contained at a ratio of (A):(B)=50:50 to 5:95 (parts by weight);
(17) the curable composition according to any one of (1) to (16), further comprising:
at least one of an amine compound (d1) and an organic dialkyltin compound (d2) as a condensation catalyst (D);
(18) a sealing material, comprising the curable composition according to any one of (1) to (17) as a component;
(19) an adhesive, comprising the curable composition according to any one of (1) to (17) as a component;
(20) a contact adhesive, comprising the curable composition according to any one of (1) to (17) as a component;
(21) the contact adhesive according to any one of (1) to (17), comprising the polyether polymer (A) and the polyether polymer (B); and
(22) a cured product, obtained by curing the curable composition according to any one of (1) to (17).

Advantageous Effects of Invention

The curable composition of the present invention comprising the reactive silyl group-containing polyether polymer (A), and the reactive silyl group-containing polyether polymer (B) and/or the reactive silyl group-containing (meth)acrylic polymer has excellent elongation properties and rapid curability and is also excellent in initial tack properties.

DESCRIPTION OF EMBODIMENTS

Hereinafter, the present invention will be described in detail.
(Reactive Silyl Group-Containing Polyether Polymer (A))
The reactive silyl group-containing polyether polymer (A) in the present invention is an organic polymer containing a reactive silyl group represented by the following formula (1):

wherein R$^1$ represents a C1 to C20 hydrocarbon group wherein at least one hydrogen atom on carbon atoms at positions 1 to 3 is replaced with halogen, —OR$^3$, —NR$^4$R$^5$, —N=R$^6$, —SR$^7$ (in which each of R$^3$, R$^4$, R$^5$, and R$^7$ is a hydrogen atom or a C1 to C20 substituted or unsubstituted hydrocarbon group, and R$^6$ is a divalent C1 to C20 substituted or unsubstituted hydrocarbon group), a C1 to C20 perfluoroalkyl group, or a cyano group; R$^2$ represents a C1 to C20 hydrocarbon group, a C6 to C20 aryl group, a C7 to C20 aralkyl group, or a triorganosiloxy group represented by R$^0{}_3$SiO— wherein each of three R$^0$s is a C1 to C20 hydrocarbon group and they may be the same as or different from each other; X represents a hydroxy or hydrolyzable group; W represents a linking group selected from —O—R$^8$—, —O—CO—N(R$^9$)—, —N(R$^9$)—CO—O—, —N(R$^9$)—CO—N(R$^9$)—, —S—CO—NH—, —NH—CO—S—, and —S— wherein R$^8$ represents a divalent C1 to C8 hydrocarbon group, and R$^9$ represents hydrogen or a C1 to C18 hydrocarbon group optionally substituted with halogen; in the case that W is —O—R$^8$—, a is 1 or 2, b is 0 or 1, and c is 1 or 2, provided that the condition: a+b+c=3 is satisfied; in the case that W is a group other than —O—R$^8$—, a is 0, 1, or 2, b is 0, 1, or 2, and c is 1, 2, or 3, provided that the condition: a+b+c=3 is satisfied; and in the case that a plurality of R$^1$s, R$^2$s, Xs, Ws, or R$^9$s exist, they may be the same as or different from each other.

(Regarding Reactive Silyl Group of Formula (1))
(I) In the Case that the Linking Group W in Formula (1) is —O—R$^8$—:

The substituents bonded to the silicon atom in formula (1) require a hydrolyzable or hydroxy group as well as a hydrocarbon group wherein at least one hydrogen atom on carbon atoms at positions 1 to 3 is replaced with halogen, —OR$^3$, —NR$^4$R$^5$, —N=R$^6$, —SR$^7$ (in which each of R$^3$, R$^4$, R$^5$, and R$^7$ is a hydrogen atom or a C1 to C20 substituted or unsubstituted hydrocarbon group, and R$^6$ is a divalent C1 to C20 substituted or unsubstituted hydrocarbon group), a C1 to C20 perfluoroalkyl group, or a cyano group. By virtue of the reactive silyl group represented by formula (1), the polyether polymer (A) in the present invention exhibits rapid curability, compared with organic polymers containing a reactive silyl group that contains an unsubstituted hydrocarbon group such as a methyl group (e.g., a dimethoxymethylsilyl group).

For higher curability, R$^1$ in formula (1) is more preferably a substituent represented by the following formula (4):

$$-CR^{10}_{3-e}Y_e \qquad (4)$$

wherein Y is a group selected from halogen, —OR$^3$, —NR$^4$R$^5$, —N=R$^6$, —SR$^7$ (in which each of R$^3$, R$^4$, R$^5$, and R$^7$ is a hydrogen atom or a C1 to C20 substituted or unsubstituted hydrocarbon group, and R$^6$ is a divalent C1 to C20 substituted or unsubstituted hydrocarbon group), a C1 to C20 perfluoroalkyl group, and a cyano group; R$^{10}$ represents a hydrogen atom or a C1 to C19 alkyl group; e represents 1, 2, or 3; in the case that a plurality of R$^{10}$s or Ys exist, they may be the same as or different from each other.

The substituent represented by formula (4) is one kind of R$^1$ in formula (1) and represents a hydrocarbon group having a heteroatom at position 1. In the case that two or more R$^{10}$s exist, the total number of carbon atoms in two R$^{10}$s is preferably 0 to 19.

Examples of Y in formula (4) include, but not limited to: halogens; oxygen-containing substituents such as alkoxy groups and acyloxy groups; nitrogen-containing substituents such as amino groups, alkylamino groups, and ureido groups; a cyano group; and perfluoroalkyl groups.

More specific examples thereof include: halogens such as fluorine, chlorine, bromine, and iodine; alkoxy groups such as a methoxy group, an ethoxy group, a 1-propoxy group, a 2-propoxy group, a 1-butoxy group, a 2-butoxy group, a tert-butyloxy group, an octoxy group, a lauryloxy group, a phenoxy group, and a benzyloxy group; acyloxy groups such as an acetoxy group, a propanoyloxy group, and a benzoyloxy group; an amino group and substituted amino groups such as a methylamino group, a dimethylamino group, an ethylamino group, a diethylamino group, a propylamino group, a dipropylamino group, and a diphenylamino group; groups containing moieties bonded via a urethane or urea bond, such as an ureido group and a carbamate group; acyl groups such as an acetyl group, a propanoyl group, an octanoyl group, a lauroyl group, and a benzoyl group; alkoxycarbonyl groups such as a methoxycarbonyl group and a tert-butyloxycarbonyl group; a nitro group; a cyano group; an isocyanato group; sulfonyl groups such as a methylsulfonyl group and a toluenesulfonyl group; perfluoroalkyl groups such as a trifluoromethyl group, a pentafluoroethyl group, a perfluoropropyl group, a perfluorohexyl group, and a perfluorooctyl group; and electron-withdrawing aryl groups such as a difluorophenyl group and a pentafluorophenyl group. Preferred among these are halogens, alkoxy groups, substituted or unsubstituted amino groups, and a trifluoromethyl group, because the resulting polymer exhibits high curability. More preferred are halogens, alkoxy groups, and substituted or unsubstituted amino groups, and still more preferred are halogens and alkoxy groups. In particular, chlorine or a methoxy group is preferred in terms of high curability in the presence of an amine compound as the curing catalyst. Also, a dialkylamino group is preferred in terms of high curability in the presence of a curing catalyst such as carboxylic acids.

Examples of R$^1$ in formula (1) include, but not limited to, a fluoromethyl group, a difluoromethyl group, a trifluoromethyl group, a 3,3,3-trifluoropropyl group, a chloromethyl group, a dichloromethyl group, a 1-chloroethyl group, a 2-chloroethyl group, a 3-chloropropyl group, a 2-chloropropyl group, a 1-chloropropyl group, a bromomethyl group, an iodomethyl group, a 3-iodopropyl group, a methoxymethyl group, a 1-methoxyethyl group, an ethoxymethyl group, a phenoxymethyl group, an aminomethyl group, an N-methylaminomethyl group, an N,N-dimethylaminomethyl group, an N-ethylaminomethyl group, an N,N-diethylaminomethyl group, an acetoxymethyl group, a methylcarbamate group, and a 2-cyanoethyl group.

X in formula (1) represents a hydroxy or hydrolyzable group. The hydrolyzable group is not particularly limited and may be a conventionally known hydrolyzable group such as hydrogen, halogen, an alkoxy group, an acyloxy group, a ketoxymate group, an amino group, an amido group, an acid amido group, an aminooxy group, a mercapto group, and an alkenyloxy group. Preferred among these are a hydrogen atom, an alkoxy group, an acyloxy group, a ketoxymate group, an amino group, an amido group, an aminooxy group, a mercapto group, and an alkenyloxy group. In terms of mild hydrolysis and easy workability, more preferred are alkoxy groups such as a methoxy group and an ethoxy group, and particularly preferred are a methoxy group and an ethoxy group.

The reactive silyl group represented by formula (1) preferably has two hydrolyzable or hydroxy groups because rapid curability is then likely to be obtained.

Examples of R$^2$ in formula (1) include, but not limited to: alkyl groups such as a methyl group and an ethyl group; cycloalkyl groups such as a cyclohexyl group; aryl groups such as a phenyl group; and aralkyl groups such as a benzyl group. Among these, a methyl group is particularly preferred.

Examples of the reactive silyl group of formula (1) include, but not limited to, a (chloromethyl)methoxymethylsilyl group, a bis(chloromethyl)methoxysilyl group, a (chloromethyl)dimethoxysilyl group, a (chloromethyl)diethoxysilyl group, a (dichloromethyl)dimethoxysilyl group, a (1-chloroethyl)dimethoxysilyl group, a (1-chloropropyl)dimethoxysilyl group, a (methoxymethyl)dimethoxysilyl group, a (1-methoxyethyl)dimethoxysilyl group, a (methoxymethyl)diethoxysilyl group, an (ethoxymethyl)dimethoxysilyl group, an (ethoxymethyl)diethoxysilyl group, an (aminomethyl)dimethoxysilyl group, a (dimethylaminomethyl)dimethoxysilyl group, a (diethylaminomethyl)dimethoxysilyl group, a (diethylaminomethyl)diethoxysilyl group, an N-(2-aminoethyl)aminomethyldimethoxysilyl group, a (1-aminopropyl)dimethoxysilyl group, a (1-(N-methylamino)propyl)dimethoxysilyl group, a (1-(N,N-dimethylamino)propyl)dimethoxysilyl group, a (3-(2-aminoethyl)aminopropyl)dimethoxysilyl group, a (1-(3,3,3-trifluoro)propyl)dimethoxysilyl group, an (acetoxymethyl)dimethoxysilyl group, and an (acetoxymethyl)diethoxysilyl group. Preferred among these are a (chloromethyl)dimethoxysilyl group, a (methoxymethyl)dimethoxysilyl group, a (methoxymethyl)diethoxysilyl group, a (diethylaminomethyl)diethoxysilyl group, and a (1-(3,3,3-trifluoro)propyl)dimethoxysilyl group, in terms of their easy synthesis. More preferred are a (chloromethyl)dimethoxysilyl group, a (methoxymethyl)dimethoxysilyl group, and a (diethylaminomethyl)diethoxysilyl group, because they provide cured products with a higher degree of curing. Particularly preferred are a (chloromethyl)dimethoxysilyl group and a (methoxymethyl)dimethoxysilyl group.

In the case that the linking group W is —O—R$^8$—, specific examples of R$^8$ include divalent hydrocarbon linking groups such as —CH$_2$—, —CH$_2$CH$_2$—, —CH$_2$CH$_2$CH$_2$—, and —CH$_2$CH$_2$CH$_2$CH$_2$—.

(II) In the Case that the Linking Group W in Formula (1) is not —O—R$^8$—:

The polymer end of the polyether polymer (A) is required to be bonded to the silicon atom in the reactive silyl via a linking group represented by the following formula (5), or in other words the —W—CH$_2$— in formula (1) is required to be represented by the following formula (5):

$$—W^1—CH_2— \quad (5)$$

wherein W$^1$ represents a linking group selected from —O—CO—N(R$^9$)—, —N(R$^9$)—CO—O—, —N(R$^9$)—CO—N(R$^9$)—, —S—CO—NH—, —NH—CO—S—, and —S— wherein R$^9$ represents hydrogen or a C1 to C18 hydrocarbon group optionally substituted with halogen.

Such a polyether polymer (A) in which a specific linking group is introduced in the present invention exhibits rapid curability, compared with an organic polymer in which the silicon atom in a reactive silyl is bonded to the polymer end of the organic polymer via a C2 or higher hydrocarbon group.

Specifically, the linking group -W-CH$_2$— in formula (1) is —W$^1$—CH$_2$— when, for example, an organic polymer terminated with any of a hydroxy group, an isocyanato group, a thiol group and an amino group is allowed to react with a silane compound containing an isocyanatomethyl group and a hydrolyzable group (e.g., 1-isocyanatomethyl-trimethoxysilane, 1-isocyanatomethyl-triethoxysilane, 1-isocyanatomethyl-dimethoxymethylsilane, 1-isocyanatomethyl-diethoxymethylsilane).

When the linking group W in formula (1) is not —O—R$^8$—, specific examples of the structure of the group represented by —SiR$^1_a$R$^2_b$X$_c$ in formula (1) include a (chloromethyl)methoxymethylsilyl group, a bis(chloromethyl)methoxysilyl group, a (chloromethyl)dimethoxysilyl group, a (chloromethyl)diethoxysilyl group, a (dichloromethyl)dimethoxysilyl group, a (chloroethyl)dimethoxysilyl group, a (chloropropyl)dimethoxysilyl group, a (methoxymethyl)dimethoxysilyl group, a (methoxymethyl)diethoxysilyl group, an (ethoxymethyl)dimethoxysilyl group, an (aminomethyl)dimethoxysilyl group, a (dimethylaminomethyl)dimethoxysilyl group, a (diethylaminomethyl)dimethoxysilyl group, a (diethylaminomethyl)diethoxysilyl group, an (N-(2-aminoethyl)aminomethyl)dimethoxysilyl group, a (1-aminopropyl)dimethoxysilyl group, a (1-(N-methylamino)propyl)dimethoxysilyl group, a (1-(N,N-dimethylamino)propyl)dimethoxysilyl group, a 3-(2-aminoethyl)aminopropyldimethoxysilyl group, a (3,3,3-trifluoropropyl)dimethoxysilyl group, an (acetoxymethyl)dimethoxysilyl group, and an (acetoxymethyl)diethoxysilyl group, a methyldimethoxysilyl group, a methyldiethoxysilyl group, a methyldiisopropoxysilyl group, a trimethoxysilyl group, a triethoxysilyl group, a triisopropoxysilyl group, a methoxydimethylsilyl group, and an ethoxydimethylsilyl group. More preferred among these are a methyldimethoxysilyl group, a methyldiethoxysilyl group, a trimethoxysilyl group, and a triethoxysilyl group, in terms of the availability of the starting material silane compound containing an isocyanatomethyl group and a hydrolyzable group.

(Regarding Backbone Structure of Reactive Silyl Group-containing Polyether Polymer (A))

The backbone structure of the reactive silyl group-containing polyether polymer (A) in the present invention is not particularly limited, and those having a backbone structure containing an ether bond can be used.

Specific examples of the backbone structure containing an ether bond include: polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; polyester polymers obtained by condensation of a dibasic acid such as adipic acid and a glycol, and by ring-opening polymerization of lactones; and polycarbonate polymers obtained by polycondensation of bisphenol A and carbonyl chloride.

More preferred among these are polyoxyalkylene polymers. This is because these polymers have a relatively low glass transition temperature, and give cured products that are excellent in cold resistance.

Moreover, polyoxyalkylene polymers are particularly preferred because they have high moisture permeability and are excellent in the depth curability when used for one-pack compositions, and in adhesion.

The glass transition temperature of the reactive silyl group-containing polyether polymer (A) in the present invention is not particularly limited, and is preferably 20° C. or lower, more preferably 0° C. or lower, and particularly preferably −20° C. or lower. The glass transition temperature of higher than 20° C. may lead to high viscosity in winter or in cold districts and therefore to lower workability, and may also lead to lower flexibility and lower elongation of the cured product. The glass transition temperature values are measured by DSC.

The polyoxyalkylene polymers are polymers containing a repeating unit represented by —R$^{11}$—O— wherein R$^{11}$ is a C1 to C14 linear or branched alkylene group. R$^{11}$ is more preferably a C2 to C4 linear or branched alkylene group. Specific examples of the repeating unit represented by —R$^{11}$—O— include —CH$_2$O—, —CH$_2$CH$_2$O—, —CH$_2$CH(CH$_3$)O—, —CH$_2$CH(C$_2$H$_5$)O—, —CH$_2$C(CH$_3$)(CH$_3$)O—, and —CH$_2$CH$_2$CH$_2$CH$_2$O—.

The backbone structure of the polyoxyalkylene polymer may have one kind of repeating units, or two or more kinds of repeating units.

Particularly in applications such as sealants and adhesives, the backbone structure of the polyoxyalkylene polymer is preferably formed of a polyoxypropylene polymer having 50% by weight or more, preferably 80% by weight or more, of oxypropylene repeating units based on the total polymer backbone structure because it is then amorphous and relatively low in viscosity.

The backbone structure of the polyether polymer (A) is not particularly limited and is preferably a linear polymer in terms of excellent tackiness during the initial curing, or is preferably a branched polymer because rapid curability is then likely to be obtained. In the case that a branch exists, the number of branches is preferably 1 to 6 (i.e. the number of terminal hydroxy groups is 3 to 8), more preferably 1 to 4 (i.e., the number of terminal hydroxy groups is 3 to 6), and most preferably 1 (i.e., the number of terminal hydroxy groups is 3).

The polyoxyalkylene polymer is preferably obtained by the ring-opening polymerization reaction of a cyclic ether compound using a polymerization catalyst in the presence of an initiator.

Examples of the cyclic ether compound include ethylene oxide, propylene oxide, butylene oxide, tetramethylene oxide, and tetrahydrofuran. One of these cyclic ether compounds may be used alone, or two or more of these may be used in combination. Among these cyclic ether compounds, in particular, propylene oxide is preferably used because it provides an amorphous polyether polymer with relatively low viscosity.

Specific examples of the initiator include: alcohols such as ethylene glycol, propylene glycol, butanediol, hexamethylene glycol, neopentyl glycol, diethylene glycol, dipropylene glycol, triethylene glycol, glycerol, trimethylolmethane, trimethylolpropane, pentaerythritol, and sorbitol; and polyoxyalkylene polymers having a number average molecular weight of 300 to 4,000, such as polyoxypropylene diol, polyoxypropylene triol, polyoxyethylene diol, and polyoxyethylene triol.

The backbone structure of the reactive silyl group-containing polyether polymer (A) in the present invention may be a polyoxyalkylene polymer containing other bonds such as a urethane bond or a urea bond in the backbone structure to the extent that does not impair the effects of the present invention considerably. Specific examples of such polymers include polyurethane prepolymers.

The polyurethane prepolymers may be obtained by conventionally known methods and can be obtained, for example, by the reaction between a polyol compound and a polyisocyanate compound.

Specific examples of the polyol compound include polyether polyol, polyester polyol, polycarbonate polyol, and polyether polyester polyol.

Specific examples of the polyisocyanate compound include diphenylmethane diisocyanate, tolylene diisocyanate, xylylene diisocyanate, methylene-bis(cyclohexylisocyanate), isophorone diisocyanate, and hexamethylene diisocyanate.

The polyurethane prepolymer may be any of hydroxy- and isocyanato-terminated ones.

A cured product obtained from a curable composition containing a polymer containing a urethane bond, a urea bond and/or an ester bond in the backbone structure as the reactive silyl group-containing polyether polymer (A) in the present invention may have significantly reduced strength due to possible cleavage of the backbone at the urethane bond, urea bond and/or ester bond by heat or the like.

If the reactive silyl group-containing polyether polymer (A) in the present invention has many amide bonds (—$NR^{12}$—C(=O)—) wherein $R^{12}$ represents a hydrogen atom or a substituted or unsubstituted organic group) in the backbone skeleton, the polymer is likely to have higher viscosity. Its viscosity may be increased after storage, and thus the resulting composition may have lower workability. These amide bonds may also be cleaved by heat or the like.

Hence, in the case that the polymer contains amide bonds in the backbone structure, the number of amide bonds is 1 to 10, preferably 1.5 to 5, and more preferably 2 to 3, on average per molecule. The polymer having less than one amide bond may have insufficient curability, whereas the polymer having more than 10 amide bonds may be difficult to handle due to its high viscosity.

For these reasons, the backbone structure of the reactive silyl group-containing polyether polymer (A) in the present invention is most preferably a polyoxyalkylene polymer free from a urethane bond, a urea bond, an amide bond, an ester bond and the like linking group in the backbone structure, from the viewpoint of providing a curable composition excellent in storage stability and workability.

(Regarding Method for Producing Reactive Silyl Group-containing Polyether Polymer (A))

The reactive silyl group-containing polyether polymer (A) in the present invention is preferably obtained by any of the following methods (a) to (c):

(a) the terminal hydroxy group of a hydroxy-terminated polymer is converted to an unsaturated group such as an allyl group, and the resulting polymer is then reacted with a silane compound represented by $HSiR^1{}_nR^2{}_oX_p$ (in which n is 1 or 2, o is 0 or 1, and p is 1 or 2, provided that the condition: n+o+p=3 is satisfied; and each of $R^1$, $R^2$, and X is defined as mentioned in formula (1)) to obtain a reactive silyl group-containing polyether polymer;

(b) the terminal hydroxy group of a hydroxy-terminated polymer is converted to an unsaturated group such as an allyl group, and the resulting polymer is then reacted with dimethylchlorosilane and then hydrolyzed to obtain a silanol-terminated polymer, which is in turn reacted with a silane compound represented by $SiR^1{}_kR^2{}_lX_m$ (in which k is 1 or 2, l is 0 or 1, and m is 2 or 3, provided that the condition: k+l+m=4 is satisfied; and each of $R^1$, $R^2$, and X is defined as mentioned in formula (1)) to obtain a reactive silyl group-containing polyether polymer; and (c) the terminal hydroxy group of a hydroxy-terminated polymer is reacted with an isocyanatosilane represented by OCN—$CH_2$—$SiR^1{}_hR^2{}_iX_j$ (in which h is 0, 1, or 2, i is 0, 1, or 2, and j is 1, 2, or 3, provided that the condition: h+i+j=3 is satisfied; and each of $R^1$, $R^2$, and X is defined as mentioned in formula (1)) to obtain a reactive silyl group-containing polyether polymer.

Among these methods, the method (a) or (b) is preferred because the polymer thereby obtained is less viscous than the reactive silyl-containing organic polymer obtained by the method (c). Also, the method (c) is preferred because it achieves a high silyl group introduction rate in a relatively short time.

The reactive silyl group-containing polyether polymer (A) preferably has a molecular weight distribution (Mw/Mn) of 1.6 or less, more preferably 1.5 or less, and particularly preferably 1.4 or less.

With respect to the number average molecular weight of the reactive silyl group-containing polyether polymer (A), the lower limit is preferably 3,000 or higher, more preferably 5,000 or higher, and particularly preferably 8,000 or higher, and the upper limit is preferably 100,000 or less, more preferably 50,000 or less, and particularly preferably 35,000 or less, as determined by GPC on the polystyrene equivalent basis. The reactive silyl group-containing polyether polymer (A) having a higher molecular weight, when used for contact adhesives, causes initial tack to be developed more rapidly and also offers higher tack strength. This effect is more apparent with the molecular weight of 22,000 or higher. If the number average molecular weight is less than 3,000, a cured product formed from the reactive silyl group-containing polyether polymer (A) is likely to have lower elongation at break. If the number average molecular weight exceeds 100,000, the curing rate is likely to be reduced due to too low a concentration of reactive silyl groups. In addition, the reactive silyl group-containing polyether polymer (A) is likely to be difficult to handle due to too high viscosity.

The number of reactive silyl groups in the reactive silyl group-containing polyether polymer (A) accounts for 50% or more, more preferably 60% or more, and particularly preferably 60 to 85%, of all molecular terminal groups in order to provide a favorable rubbery cured product. If the number of reactive silyl groups accounts for less than 50% of all molecular terminal groups, the curability may be insufficient, which makes it difficult to provide a favorable rubber elastic behavior. The number of molecular terminal groups per molecule is preferably 2 to 8, more preferably 2 to 4, and particularly preferably 2 or 3. The number of reactive silyl groups per molecule is preferably 1 to 7, more preferably 1 to 3.4, and particularly preferably 1 to 2.6, on average.

The reactive silyl group may be located at a backbone terminal, or at a side chain terminal, or at both terminals, of the organic polymer chain. In particular, the reactive silyl group is preferably located at a backbone terminal of the molecular chain because the molecular weight between crosslinks is then increased, which tends to provide a rubbery cured product having higher strength, higher elongation, and lower elastic modulus.

The average number of reactive silyl groups in the reactive silyl group-containing polyether polymer (A) is defined as an average number determined by quantifying a proton on the carbon directly bonded to each reactive silyl group by a high-resolution $^1$H-NMR measurement method. With respect to the calculation of the average number of reactive silyl groups in the reactive silyl group-containing polyether polymer (A) according to the present invention, the average number of reactive silyl groups per molecule is calculated based on the parameter (the number of molecules) including, as a part of members of the reactive silyl group-containing polyether polymer (A) having the same backbone structure, a polyether polymer precursor containing no reactive silyl group introduced and by-products, modified polyether polymer precursors containing no reactive silyl group introduced after a reactive silyl group is introduced into the polyether polymer precursor into which the reactive silyl group is introduced.

(Reactive Silyl Group-containing Polyether Polymer (B))

The reactive silyl group-containing polyether polymer (B) in the present invention is not particularly limited as long as it is an organic polymer having a reactive silyl group represented by the following formula (2) at a molecular chain terminal:

$$-V-SiR^2_d X_{3-d} \qquad (2)$$

wherein $R^2$ and X are defined as mentioned in formula (1); V represents a divalent C2 to C8 hydrocarbon group; d represents any of 0, 1, and 2; and in the case that a plurality of $R^2$s or Xs exist, they may be the same as or different from each other.

(Regarding Reactive Silyl Group of Formula (2))

X in formula (2) represents a hydroxy or hydrolyzable group. Examples of the hydrolyzable group include, but not limited to, conventionally known hydrolyzable groups such as the same ones as in formula (1). In terms of mild hydrolysis and easy workability, more preferred are alkoxy groups such as a methoxy group and an ethoxy group, and particularly preferred are a methoxy group and an ethoxy group. The number of Xs is preferably 2 in terms of curability, or is preferably 3 in terms of initial tack and because the resulting cured product has favorable rubber elasticity.

Examples of $R^2$ in formula (2) include, but not limited to, the same ones as in formula (1). A methyl group is particularly preferred.

Specific examples of the linking group V in formula (2) include divalent hydrocarbon linking groups such as —CH$_2$CH$_2$—, —CH$_2$CH$_2$CH$_2$—, and —CH$_2$CH$_2$CH$_2$CH$_2$—.

Specific examples of the structure of the group represented by —SiR$^2_d$X$_{3-d}$ in formula (2) include a trimethoxysilyl group, a triethoxysilyl group, a triisopropoxysilyl group, a dimethoxymethylsilyl group, a diethoxymethylsilyl group, a diisopropoxymethylsilyl group, a methoxydimethylsilyl group, and an ethoxydimethylsilyl group. More preferred are a trimethoxysilyl group, a triethoxysilyl group, and a dimethoxymethylsilyl group, because they have high activity to achieve favorable curability. Particularly preferred is a trimethoxysilyl group. Also, a dimethoxymethylsilyl group is particularly preferred because the resulting composition exhibits favorable initial tack and favorable tensile properties. A triethoxysilyl group is preferred in terms of safety because an alcohol formed along with the hydrolysis reaction of the reactive silyl group is ethanol.

(Regarding Backbone Structure of Reactive Silyl Group-containing Polyether Polymer (B))

The backbone structure of the reactive silyl group-containing polyether polymer (B) in the present invention is not particularly limited, and ones having the same structure as in the reactive silyl group-containing polyether polymer (A) can be used. Preferred among these are backbone structures derived from polyoxypropylene diol and/or polyoxypropylene triol, and more preferred are backbone structures derived from polyoxypropylene diol.

(Regarding Reactive Silyl Group-containing Polyether Polymer (B))

The reactive silyl group-containing polyether polymer (B) in the present invention is preferably obtained by the following method (d):

(d) the terminal hydroxy group of a hydroxy-terminated polyoxyalkylene polymer is converted to an unsaturated group such as an allyl group, and the resulting polymer is then reacted with a silane compound represented by HSiR$^2_d$X$_{3-d}$ (in which each of R$^2$, X, and d is defined as mentioned in formula (2)) to obtain a reactive silyl group-containing polyether polymer.

The reactive silyl group-containing polyether polymer (B) preferably has a molecular weight distribution (Mw/Mn) of 1.6 or less, more preferably 1.5 or less, and particularly preferably 1.4 or less.

One of reactive silyl group-containing polyether polymers (B) may be used alone, or two or more of these may be used in combination.

With respect to the number average molecular weight of the reactive silyl group-containing polyether polymer (B), the lower limit is preferably 3,000 or higher, more preferably 5,000 or higher, and particularly preferably 8,000 or higher, and the upper limit is preferably 100,000 or less, more preferably 50,000 or less, and particularly preferably 35,000 or less, as determined by GPC on the polystyrene equivalent basis. If the number average molecular weight is less than 3,000, the resulting cured product is likely to have lower elongation at break. If the number average molecular weight exceeds 100,000, the curing rate is likely to be reduced due to too low a concentration of reactive silyl groups. In addition, the reactive silyl group-containing polyether polymer (B) is likely to be difficult to handle due to too high viscosity.

When the molecular weights are compared between the reactive silyl group-containing polyether polymer (A) and the reactive silyl group-containing polyether polymer (B), the molecular weight of the polymer (A) is preferably larger than that of the polymer (B). The polymer (A) reacts in the initial stage of curing and is thus responsible for tack development. In this regard, the polymer (A) having a higher molecular weight is preferred because it is likely to cause higher rate of tack development and also offer higher tack strength. On the other hand, the polymer (B) decreases the viscosity of the composition while it is cured later than the polymer (A) and is thus responsible for enhancing the final strength of the adhesive. Hence, the molecular weight of the polymer (B) needs to be lower than that of the polymer (A) and its number average molecular weight is preferably smaller by 5000 or higher.

The reactive silyl group-containing polyether polymer (B) is most preferably a mixture of a polymer (b1) having a molecular weight of 8000 or higher and a polymer (b2) having a molecular weight less than 8000 because the resulting composition is likely to be excellent in the balance between the viscosity before curing and the physical properties after curing (i.e., higher elongation and strength of the cured product). In the case of using the polymer (b1) having a molecular weight of 8000 or higher and the polymer (b2) having a molecular weight less than 8000, the number average molecular weight of the polymer (B) is defined as an apparent number average molecular weight calculated based on the mixture of the polymer (b1) and the polymer (b2) regarded as one polymer.

The reactive silyl group introduction rate (silylation rate) of the reactive silyl group-containing polyether polymer (B) is, on average per molecule, more than 50%, more preferably 60% or more, and particularly preferably 60 to 85%, of all molecular terminal groups in order to provide a favorable rubbery cured product. If the number of reactive silyl groups accounts for less than 50% of all molecular terminal groups, the curability may be insufficient, which makes it difficult to provide a favorable rubber elastic behavior. The number of reactive silyl groups per molecule is preferably 1 to 7, more preferably 1 to 3.4, and particularly preferably 1 to 2.6, on average.

The backbone structure of the reactive silyl group-containing polyether polymer (B) is preferably a linear structure or a branched structure having 1 to 6 branches, and is more preferably a linear structure or a branched structure having 1 to 2 branches, and particularly preferably a linear structure or a branched structure having 1 branch. If the number of terminals bonded to the reactive silyl group per molecule is increased, the crosslink density may be increased, which makes it difficult to offer favorable elongation properties.

The reactive silyl group may be located at a backbone terminal, or at a side chain terminal, or at both terminals, of the organic polymer chain. In particular, the reactive silyl group is preferably located at a backbone terminal of the molecular chain because the molecular weight between crosslinks is then increased, which tends to provide a rubbery cured product having higher strength, higher elongation, and lower elastic modulus.

The blend ratio of the reactive silyl group-containing polyether polymer (B) is not particularly limited. In applications such as sealing materials and adhesives, relative to 100 parts by weight of the polymer (A), the lower limit is preferably 10 parts by weight or higher, more preferably 100 parts by weight or higher, and particularly preferably 150 parts by weight or higher, and the upper limit is preferably 1000 parts by weight or less, more preferably 950 parts by weight or less, still more preferably 900 parts by weight or less, even more preferably 700 parts by weight or less, and particularly preferably 400 parts by weight or less.

Alternatively, in application to contact adhesives, relative to 100 parts by weight of the polymer (A), the lower limit is preferably 100 parts by weight or higher, and more preferably 150 parts by weight or higher, and the upper limit is preferably 900 parts by weight or less, more preferably 600 parts by weight or less, and particularly preferably 500 parts by weight or less. An adhesive with a higher proportion of the reactive silyl group-containing polyether polymer (A) is likely to fall into a so-called skinning (the surface of the adhesive is cured during the course of curing) and thus the working life tends to be short. If the ratio of the polymer (B) is less than 5 parts by weight, the curing is likely to be slowed.

(Reactive Silyl Group-containing (Meth)Acrylic Polymer (C))

The reactive silyl group-containing (meth)acrylic polymer (C) in the present invention is not particularly limited as long as it is a (meth)acrylic polymer having a reactive silyl group represented by formula (3) at a molecular chain terminal and/or a side chain:

$$-Z-(CH_2)_n-SiR^1_aR^2_bX_c \quad (3)$$

wherein $R^1$, $R^2$, and X are defined as mentioned in formula (1); Z represents a linking group selected from —CO—O—, —O—CO—N($R^9$)—, —N($R^9$)—CO—O—, —N($R^9$)—CO—N($R^9$)—, —S—CO—NH—, —NH—CO—S—, and —S— wherein $R^9$ is defined as mentioned in formula (1); n represents a number of 1 to 8; a is 0, 1, or 2, b is 0, 1, or 2, and c is 1, 2, or 3, provided that a+b+c=3 is satisfied; and in the case that a plurality of $R^1$s, $R^2$s, or Xs exist, they may be the same as or different from each other.

(Regarding Reactive Silyl Group of Formula (3))

The polymer end of the reactive silyl group-containing (meth)acrylic polymer (C) is required to be bonded to the silicon atom in the reactive silyl via the linking group represented by —Z—$(CH_2)_n$—. Such a reactive silyl group-containing (meth)acrylic organic polymer (C) in the present invention in which a specific linking group is introduced can be affected by the number of carbon atoms between the silicon atom in the reactive silyl group and Z in terms of curing rate and provides rapid curability with n being 1.

Specific examples of the structure of the group represented by —$SiR^1_aR^2_bX_c$ in formula (3) include a (chloromethyl)methoxymethylsilyl group, a bis(chloromethyl)methoxysilyl group, a (chloromethyl)dimethoxysilyl group, a (1-chloroethyl)dimethoxysilyl group, a (chloromethyl)diethoxysilyl group, a (dichloromethyl)dimethoxysilyl group, a (1-chloropropyl)dimethoxysilyl group, a (methoxymethyl)dimethoxysilyl group, a (methoxymethyl)diethoxysilyl group, a (ethoxymethyl)dimethoxysilyl group, an (aminomethyl)dimethoxysilyl group, an (dimethylaminomethyl)dimethoxysilyl group, a (diethylaminomethyl)dimethoxysilyl group, a (diethylaminomethyl)diethoxysilyl group, an (N-(2-aminoethyl)aminomethyl)dimethoxysilyl group, a (1-aminopropyl)dimethoxysilyl group, a (1-(N-methylamino)propyl)dimethoxysilyl group, a (1-(N,N-dimethylamino)propyl)dimethoxysilyl group, a (3-(2-aminoethyl)aminopropyl)dimethoxysilyl group, a (3,3,3-trifluoropropyl)dimethoxysilyl group, an (acetoxymethyl)dimethoxysilyl group, an (acetoxymethyl)diethoxysilyl group, a methyldimethoxysilyl group, a methyldiethoxysilyl group, a methyldiisopropoxysilyl group, a trimethoxysilyl group, a triethoxysilyl group, a triisopropoxysilyl group, a methoxydimethylsilyl group, and an ethoxydimethylsilyl group. More preferred among these are a methyldimethoxysilyl group, a methyldiethoxysilyl group, a trimethoxysilyl group, and a triethoxysilyl group, in terms of the availability of the starting material silane compound.

(Regarding Backbone Structure of Reactive Silyl Group-containing (Meth)Acrylic Polymer (C))

The monomer units constituting the backbone structure of the reactive silyl group-containing (meth)acrylic polymer (C) in the present invention are not particularly limited, and one kind and/or two or more kinds of monomer (c) having a (meth)acrylic structure are preferably used.

Specific examples of the monomer (c) having a (meth) acrylic structure include: alkyl(meth)acrylate monomers such as methyl(meth)acrylate, ethyl (meth)acrylate, n-propyl (meth)acrylate, isopropyl (meth)acrylate, n-butyl(meth)acrylate, isobutyl (meth)acrylate, s-butyl(meth)acrylate, tert-butyl (meth)acrylate, neopentyl(meth)acrylate, n-hexy (meth)acrylate, n-heptyl(meth)acrylate, 2-ethylhexyl (meth)acrylate, nonyl(meth)acrylate, decyl(meth)acrylate, undecyl (meth)acrylate, lauryl(meth)acrylate, tridecyl (meth)acrylate, tetradecyl(meth)acrylate, hexadecyl (meth)acrylate, stearyl(meth)acrylate, behenyl (meth)acrylate, and cyclohexyl(meth)acrylate; and (meth)acrylate monomers such as 2-methoxyethyl (meth)acrylate, 3-methoxybutyl(meth)acrylate, 2-hydroxyethyl(meth)acrylate, 2-hydroxypropyl(meth)acrylate, ethylene oxide adducts of (meth)acrylic acid, 2,2,2-trifluoroethyl(meth)acrylate, 3,3,3-trifluoropropyl(meth)acrylate, 3,3,4,4,4-pentafluorobutyl(meth)acrylate, 2-perfluoroethyl-2-perfluorobutylethyl(meth)acrylate, trifluoromethyl(meth)acrylate, perfluoroethyl (meth)acrylate, bis(trifluoromethyl)methyl(meth)acrylate, 2-trifluoromethyl-2-perfluoroethylethyl(meth)acrylate, 2-perfluorohexylethyl(meth)acrylate, 2-perfluorodecylethyl (meth)acrylate, 2-perfluorohexadecylethyl(meth)acrylate, dimethylaminoethyl(meth)acrylate, chloroethyl (meth)acrylate, tetrahydrofurfuryl(meth)acrylate, and glycidyl(meth)acrylate. One of these monomers may be used alone, or two or more of these may be used in combination.

A monomer copolymerizable with such a monomer may also be used to the extent that does not impair the physical properties. Examples of such monomers include: styrene monomers such as styrene, vinyltoluene, α-methylstyrene, chlorostyrene, and styrenesulfonic acid; fluorine-containing vinyl monomers such as perfluoroethylene, perfluoropropylene, and vinylidene fluoride; maleic acid and its derivatives such as maleic acid, maleic anhydride, and monoalkyl or dialkyl esters of maleic acid; fumaric acid and its derivatives such as fumaric acid and monoalkyl or dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; vinyl ester monomers such as vinyl acetate, vinyl propionate, vinyl pivalate, vinyl benzoate, and vinyl cinnamate; olefin monomers such as ethylene and propylene; conjugated diene monomers such as butadiene and isoprene; (meth)acrylamide; (meth)acrylonitrile; and vinyl monomers such as vinyl chloride, vinylidene chloride, allyl chloride, allyl alcohol, ethyl vinyl ether, and butyl vinyl ether. One of these monomers may be used alone, or two or more of these may be used in combination.

The monomer units constituting the backbone structure of the reactive silyl group-containing (meth)acrylic polymer (C) preferably contain 50% by weight or more, more preferably 70% by weight or more, of alkyl(meth)acrylate monomer in terms of the compatibility with the reactive silyl group-containing polyether polymer (A). The alkyl(meth)acrylate monomer is preferably a combination of an alkyl(meth)acrylate monomer (c1) containing a C1 to C8 alkyl group and an alkyl(meth)acrylate monomer (c2) containing a C10 to C30 alkyl group. In this case, the ratio between the alkyl(meth)acrylate monomer (c1) and the alkyl(meth)acrylate monomer (c2) is preferably (c1):(c2)=95:5 to 40:60, and more preferably 90:10 to 60:40, by weight ratio.

As combinations without the use of the component (c2), for example, a combination of methyl(meth)acrylate, butyl (meth)acrylate, and an alkyl(meth)acrylate monomer containing a C7 to C9 alkyl group, a combination of an alkyl (meth)acrylate monomer containing a C1 or C2 alkyl group and an alkyl(meth)acrylate monomer containing a C7 to C9 alkyl group, and other combinations are preferred in terms of the compatibility with the reactive silyl group-containing polyether polymer (A).

The reactive silyl group-containing (meth)acrylic polymer (C) can be obtained by various polymerization methods. Its production method is not particularly limited, and radical polymerization is preferred in terms of versatile monomers and easy control.

Radical polymerization methods can be classified into "general radical polymerization" and "controlled radical polymerization". The "general radical polymerization" is a convenient polymerization method which merely involves polymerization using a polymerization initiator such as an azo compound or peroxide. On the other hand, the "controlled radical polymerization" is a method capable of introducing a specific functional group into a controlled site such as a terminal. The "controlled radical polymerization" methods can be further classified into "chain transfer agent polymerization" and "living radical polymerization". The "chain transfer agent polymerization" is characterized by polymerization using a chain transfer agent containing a specific functional group and produces a vinyl polymer containing the functional group at a terminal. On the other hand, the "living radical polymerization" is characterized in that a growing polymer end grows without side reactions such as termination, and this method produces a polymer having a molecular weight nearly as high as designed. In the present invention, any of these polymerization methods may be used.

Specific examples of the "general radical polymerization" include solution polymerization and bulk polymerization, which involve adding a polymerization initiator, a chain transfer agent, a solvent, etc., followed by polymerization at 50 to 150° C.

Examples of the polymerization initiator include: azo compounds such as 2,2'-azobis(2-methylbutyronitrile), dimethyl 2,2'-azobis(2-methylpropionate), 2,2'-azobis(2,4-dimethylvaleronitrile), 2,2'-azobis(4-methoxy-2,4-dimethylvaleronitrile), 2,2'-azobis[N-(2-propenyl)-2-methylpropionamide], and 1,1'-azobis(cyclohexane-1-carbonitrile); diacyl peroxides such as benzoyl peroxide, isobutyryl peroxide, isononanoyl peroxide, decanoyl peroxide, lauroyl peroxide, p-chlorobenzoyl peroxide, and di(3,5,5-trimethylhexanoyl) peroxide; peroxydicarbonates such as diisopropyl peroxydicarbonate, di-sec-butyl peroxydicarbonate, di-2-ethylhexyl peroxydicarbonate, di-1-methylheptyl peroxydicarbonate, di-3-methoxybutyl peroxydicarbonate, and dicyclohexyl peroxydicarbonate; peroxy esters such as tert-butyl perbenzoate, tert-butyl peracetate, tert-butyl per-2-ethylhexanoate, tert-butyl perisobutyrate, tert-butyl perpivalate, tert-butyl diperadipate, and cumyl perneodecanoate; ketone peroxides such as methyl ethyl ketone peroxide and cyclohexanone peroxide; dialkyl peroxides such as di-tert-butyl peroxide, dicumyl peroxide, tert-butylcumyl peroxide, and 1,1-di(tert-hexylperoxy)-3,3,5-trimethylcyclohexane; hydroperoxides such as cumene hydroxyperoxide and tert-butyl hydroperoxide; and peroxides such as 1,1-di(tert-hexylperoxy)-3,3,5-trimethylcyclohexane. One of these polymerization initiators may be used alone, or two or more of these may be used in combination.

Examples of the chain transfer agent include mercapto group-containing compounds such as n-dodecylmercaptan, tert-dodecylmercaptan, and laurylmercaptan. In order to introduce a reactive silyl group into the molecular chain terminal of the (meth)acrylic polymer, for example, a compound (c3) containing a reactive silyl group and a mercapto group is preferably used, such as 3-mercaptopropyltrimethoxysilane, 3-mercaptopropylmethyldimethoxysilane, mercaptomethyltrimethoxysilane, mercaptomethylmethyldimethoxysilane, 3-mercaptopropylchloromethyldimethoxysilane, 3-mercaptopropylmethoxymethyldimethoxysilane, 3-mercaptopropylaminomethyldimethoxysilane, and 3-mercaptopropyl-N,N-dimethylaminomethyldimethoxysilane. One of these chain transfer agents may be used alone, or two or more of these may be used in combination.

Examples of the solvent include: aromatic compounds such as toluene, xylene, styrene, ethylbenzene, p-dichlorobenzene, di-2-ethylhexyl phthalate, and di-n-butyl phthalate; hydrocarbon compounds such as hexane, heptane, octane, cyclohexane, and methylcyclohexane; carboxylate compounds such as butyl acetate, n-propyl acetate, and isopropyl acetate; ketone compounds such as methyl isobutyl ketone and methyl ethyl ketone; dialkyl carbonate compounds such as dimethyl carbonate and diethyl carbonate; and alcohol compounds such as n-propanol, 2-propanol, n-butanol, 2-butanol, isobutanol, tert-butanol, and amyl alcohol. Among these, one or more selected from dialkyl carbonate compounds and alcohol compounds are preferred in terms of exclusion from substances specified by the Ministry of Health, Labor and Welfare's concentration guidelines, odor, environmental load, etc. In terms of boiling point and of reduction in the emission of total volatile organic compounds from the composition, measured by the method described in the Feb. 14, 2001 edition of GEV Specification and Classification Criteria established by GEV (Gemeinschaft Emissionskontrollierte Verlegewerkstoffe e.V.), more preferred are dimethyl carbonate, n-propanol, 2-propanol, n-butanol, 2-butanol, isobutanol, and tert-butanol, and particularly preferred are 2-propanol and isobutanol.

In addition to the solvent, a reactive silyl group-containing polyether polymer or its precursor compound, a plasticizer described later, etc., may also be used in the polymerization.

The "chain transfer agent polymerization" is a method that can quantitatively introduce a functional group into a polymer end, compared with the "general radical polymerization".

Unlike the polymerization method mentioned above, the "living radical polymerization" is a method that can produce a polymer having a desired molecular weight, a narrow molecular weight distribution, and low viscosity and can also introduce a monomer containing a specific functional group into almost any site in a polymer. In a narrow sense, living polymerization refers to polymerization in which a molecular chain grows with its terminal kept active constantly. In general, the living polymerization also encompasses pseudo-living polymerization in which a molecular chain grows with its terminal in equilibrium between inactive and active states.

Examples of the "living radical polymerization" include a method using a cobalt-porphyrin complex as described in J. Am. Chem. Soc., 1994, vol. 116, p. 7943, a method using a nitroxide radical as described in JP-T 2003-500378, and atom transfer radical polymerization (ATRP) using an initiator such as an organic halide or a sulfonyl halide compound and a transition metal complex catalyst as described in JP-A H11-130931. The atom transfer radical polymerization as used herein also encompasses so-called reverse atom transfer radical polymerization as described in Macromolecules, 1999, vol. 32, p. 2872, i.e., a polymerization method which creates a high oxidation state as obtained when radicals are generated by a common atom transfer radical polymerization catalyst, for example, a polymerization method that creates the same equilibrium as in atom transfer radical polymerization, as a result of the action of an ordinary radical initiator such as peroxide on Cu(II') derived from Cu(I) as a catalyst.

In addition to these polymerization methods, other methods may be used, including: a method which involves using a metallocene catalyst and a thiol compound having at least one reactive silyl group per molecule to produce an acrylic polymer, as described in JP-A 2001-040037; and a high-temperature continuous polymerization method which involves continuously polymerizing a vinyl monomer using a stirred tank reactor, as described in JP-T S57-502171, JP-A S59-006207, and JP-A S60-511992.

(Regarding Method for Producing Reactive Silyl Group-containing (Meth)Acrylic Polymer (C))

The method for introducing a reactive silyl group into a (meth)acrylic polymer is not particularly limited and may be, for example, any of the following methods (i) to (iv):

(i) a compound (c4) containing a polymerizable unsaturated group and a reactive silyl group is copolymerized with a monomer (b) having the (meth)acrylic structure mentioned above;

(ii) a monomer (c) having the (meth)acrylic structure is copolymerized in the presence of the compound (c3) containing a reactive silyl group and a mercapto group as a chain transfer agent;

(iii) a compound containing a polymerizable unsaturated group and a reactive functional group (e.g., acrylic acid, 2-hydroxyethyl acrylate) is copolymerized with a monomer (b) having the (meth)acrylic structure, and the resulting product is then reacted with a compound containing a reactive silyl group and a functional group that is reactive with the reactive functional group (e.g., isocyanatosilane compounds); and (iv) a monomer (c) having the (meth)acrylic structure is polymerized by living radical polymerization, and a reactive silyl group is then introduced into the molecular chain terminal of the resulting polymer.

These methods may be used in any combination.

Of these methods, a combination of the methods (i) and (ii) is more preferably used because it can introduce a reactive silyl group into a molecular chain terminal or a side chain, or both. The method (iv) is more preferred because it can produce a polymer having a desired molecular weight, a narrow molecular weight distribution, and low viscosity.

Examples of the compound (c4) containing a polymerizable unsaturated group and a reactive silyl group include: compounds containing a (meth)acryloxy group and a reactive silyl group, such as 3-(meth)acryloxypropyltrimethoxysilane, 3-(meth)acryloxypropylmethyldimethoxysilane, 3-(meth)acryloxypropyltriethoxysilane, ((meth)acryloxymethyl)trimethoxysilane, ((meth)acryloxymethyl)methyldimethoxysilane, (meth)acryloxymethyldimethylmethoxysilane, 3-(meth)acryloxypropylchloromethyldimethoxysilane, 3-(meth)acryloxypropylmethoxymethyldimethoxysilane, 3-(meth)acryloxypropylaminomethyldimethoxysilane, and 3-(meth)acryloxypropyl-N,N-dimethylaminomethyldimethoxysilane; and compounds containing a vinyl group and a reactive silyl group, such as vinyltrimethoxysilane, vinylmethyldimethoxysilane, vinyltriethoxysilane, vinylchloromethyldimethoxysilane, vinylmethoxymethyldimethoxysilane, vinylaminomethyldimethoxysilane, and vinyl-N,N-dimethylaminomethyldimethoxysilane. One of these compounds may be used alone, or two or more of these may be used in combination.

The number average molecular weight of the reactive silyl group-containing (meth)acrylic polymer (C) in the present invention is not particularly limited, and the lower limit is preferably 500 or higher, and more preferably 1,000 or higher, and the upper limit is preferably 100,000 or less, more preferably 50,000 or less, and particularly preferably 30,000 or less, as determined by GPC on the polystyrene equivalent basis.

The reactive silyl group of the reactive silyl group-containing (meth)acrylic polymer (C) in the present invention may be introduced at any of a molecular chain terminal and a side chain. In terms of adhesion, the reactive silyl group is preferably introduced at both a molecular chain terminal and a side chain. With respect to the number of reactive silyl groups on average per molecule, the lower limit is preferably 0.5 or more, more preferably 0.7 or more, and particularly preferably 1.0 or more, and the upper limit is preferably 2.0 or less, more preferably 1.9 or less, and particularly preferably 1.8 or less.

The blend ratio of the reactive silyl group-containing (meth)acrylic polymer (C) is not particularly limited. In application to sealing materials and adhesives, relative to 100 parts by weight of the reactive silyl group-containing polyether polymer (A), the lower limit is preferably 10 parts by weight or higher, more preferably 20 parts by weight or higher, and particularly preferably 40 parts by weight or higher, and the upper limit is preferably 700 parts by weight or less, more preferably 500 parts by weight or less, and particularly preferably 30 parts by weight or less. If the ratio of the polymer (C) is less than 10 parts by weight, sufficient effect on initial tack or tensile properties may not be obtained. If the ratio of the polymer (C) exceeds 700 parts by weight, the resulting composition is likely to be difficult to handle due to too high viscosity.

Alternatively, in application to contact adhesives, relative to 100 parts by weight in total of the polymer (A) and the polymer (B), the lower limit is preferably 5 parts by weight or higher, and more preferably 10 parts by weight or higher, and the upper limit is preferably 200 parts by weight or less, and more preferably 100 parts by weight or less.

In order to secure the initial tack properties of contact adhesives, the curable composition of the present invention preferably contains the reactive silyl group-containing polyether polymer (A), the reactive silyl group-containing polyether polymer (B), and the reactive silyl group-containing (meth)acrylic polymer (C).

The curable composition of the present invention may further contain a condensation catalyst (D) for the purpose of promoting the cross-linking reaction of the reactive silyl groups in the reactive silyl group-containing polyether polymer (A), and the reactive silyl group-containing polyether polymer (B) and/or the reactive silyl group-containing (meth) acrylic polymer (C) via hydrolysis and condensation.

Examples of the condensation catalyst include, but not limited to, conventionally known catalysts. In particular, amine compounds and carboxylic acids are preferred because they cause the polyether polymer (A) containing the reactive silyl group represented by formula (1) to be cured in a very short time.

Examples of amine compounds (d1) that can be used as the condensation catalyst include, but not limited to: aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine and oleylamine; aromatic amines such as aniline, laurylaniline, stearylaniline, and triphenylamine; nitrogen-containing heterocyclic compounds such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,2-dimethyl-1,4,5,6-tetrahydropyrimidine, 1,8-diazabicyclo(5,4,0)undecene-7 (DBU), 6-(dibutylamino)-1,8-diazabicyclo(5,4,0)undecene-7 (DBA-DBU), 1,5-diazabicyclo(4,3,0)nonene-5 (DBN), 1,4-diazabicyclo(2,2,2)octane (DABCO), and aziridine, as well as other amines including amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-dibutylaminopropylamine, 3-morpholinopropylamine, 2-(1-piperazinyl)ethylamine, xylylenediamine, and 2,4,6-tris(dimethylaminomethyl)phenol; guanidines such as guanidine, phenylguanidine, and diphenylguanidine; and biguanides such as butylbiguanide, 1-o-tolylbiguanide, and 1-phenylbiguanide.

Preferred among these are amidines such as 1,2-dimethyl-1,4,5,6-tetrahydropyrimidine, DBU, DBA-DBU, and DBN; guanidines such as guanidine, phenylguanidine, and diphenylguanidine; and biguanides such as butylbiguanide, 1-o-tolylbiguanide, and 1-phenylbiguanide, in terms of high activity. Also preferred are aryl-substituted biguanides such as 1-o-tolylbiguanide and 1-phenylbiguanide, because high adhesion can then be expected.

Amine compounds are basic. Amine compounds whose conjugate acids have a pKa value of 11 or larger have high catalytic activity and are thus preferred. For example, 1,2-dimethyl-1,4,5,6-tetrahydropyrimidine, DBU, DBN and the like, whose conjugate acids have a pKa value of 12 or larger, have high catalytic activity and are thus particularly preferred.

In the present invention, an amino group-containing silane coupling agent (hereinafter referred to also as aminosilane) may be used as the amine compound serving as the condensation catalyst. The aminosilane refers to a compound that contains a group containing a hydrolyzable group bonded to a silicon atom (hereinafter referred to also as hydrolyzable silyl group) and a substituted or unsubstituted amino group.

Examples of the substituent in the substituted amino group include, but not limited to, alkyl groups, aralkyl groups, and aryl groups.

The hydrolyzable silyl group is not particularly limited, and may be, for example, a hydrogen atom, a halogen atom, an alkoxy group, an aryloxy group, an alkenyloxy group, an acyloxy group, a ketoxymate group, an amino group, an amido group, an acid amido group, an aminooxy group, a mercapto group or the like. Preferred among these are a halogen atom, an alkoxy group, an alkenyloxy group, and an aryloxy group, in terms of high activity. A chlorine atom or an alkoxy group can be introduced easily and is thus preferred. In terms of mild hydrolysis and easy workability, more preferred are alkoxy groups such as a methoxy group and an ethoxy group, and particularly preferred are a methoxy group and an ethoxy group. Also, an ethoxy group and an isopropenoxy group are preferred in terms of safety because compounds eliminated by reaction are ethanol and acetone, respectively. The number of hydrolyzable groups bonded to a silicon atom in the aminosilane is preferably 2 or more, particularly 3 or more.

Examples of the aminosilane include, but not limited to, γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, N-β-aminoethyl-γ-aminopropyltrimethoxysilane, N-β-aminoethyl-γ-aminopropylmethyldimethoxysilane, N-β-aminoethyl-γ-aminopropyltriethoxysilane, N-β-aminoethyl-γ-aminopropylmethyldiethoxysilane, N-β-aminoethyl-γ-aminopropyltriisopropoxysilane, N-β-(β-aminoethyl)aminoethyl-γ-aminopropyltrimethoxysilane, N-6-aminohexyl-γ-aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine.

Among these aminosilanes, aminosilanes containing an amino group (—NH$_2$) are preferred in terms of curability; and preferred are γ-aminopropyltrimethoxysilane, γ-aminopropyltriethoxysilane, γ-aminopropylmethyldimethoxysilane, and N-β-aminoethyl-γ-aminopropyltrimethoxysilane, in terms of their availability.

A ketimine compound that is hydrolyzed into the amine compound can also be used as the condensation catalyst.

Examples of usable condensation catalysts other than the amine compounds include: carboxylic acids such as 2-ethylhexanoic acid, octylic acid, neodecanoic acid, oleic acid, and naphthenic acid; metal salts of carboxylic acids such as tin carboxylates, lead carboxylates, bismuth carboxylates, potassium carboxylates, calcium carboxylates, barium carboxylates, titanium carboxylates, zirconium carboxylates, hafnium carboxylates, vanadium carboxylates, manganese carboxylates, iron carboxylates, cobalt carboxylates, nickel carboxylates, and cerium carboxylates; titanium compounds such as tetrabutyl titanate, tetrapropyl titanate, tetrakis(acetylacetonato)titanium, bis(acetylacetonato)diisopropoxytitanium, and diisopropoxy bis(ethylacetoacetato)titanium; dibutyltin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dibutyltin dimethoxide, dibutyltin bis(nonylphenoxide), dibutenyltin oxide, dibutyltin oxide, dibutyltin bis(acetylacetonate), dibutyltin bis(ethylacetoacetate), reaction products of dibutyltin oxide and a silicate compound, and reaction products of dibutyltin oxide and a phthalic acid ester; dioctyltin compounds such as dioctyltin bis(triethoxysilicate), dioctyltin dimethoxide, dioctyltin diacetylacetonate, dioctyltin diacetate, dioctyltin dioctoate, dioctyltin diversatate, dioctyltin dilaurate, dioctyltin distearate, dioctyltin dibehenate, dioctyltin dioleate, bis(dioctyltin acetate) oxide, bis(dioctyltin octoate) oxide, bis(dioctyltin versatate) oxide, bis(dioctyltin laurate) oxide, bis(dioctyltin stearate) oxide, bis(dioctyltin behenate) oxide, dioctyltin bis(ethylmaleate), dioctyltin bis(octylmaleate), and dioctyltin bisisooctylthioglycolate; aluminum compounds such as tris(acetylacetonato)aluminum, tris(ethylacetoacetato)aluminum, and diisopropoxyaluminum ethylacetoacetate; zirconium compounds such as tetrakis(acetylacetonato)zirconium; and various metal alkoxide compounds such as tetrabutoxyhafnium; acidic organophosphoric acid esters; organic sulfonic acids such as trifluoromethanesulfonic acid; inorganic acids such as hydrochloric acid, phosphoric acid, and boronic acid.

Preferred among these condensation catalysts are amine compounds, carboxylic acids, and dioctyltin compounds, and more preferred are amine compounds, in terms of curability and environmental load.

Two or more different catalysts may be used in combination as the condensation catalyst. For example, a combination of an amine compound and an organotin compound (dibutyltin compound or dioctyltin compound) is preferably used because of the possible effect of enhancing the curability.

The amount of condensation catalyst used is preferably 0.001 to 20 parts by weight, more preferably 0.01 to 15 parts by weight, and particularly preferably 0.01 to 10 parts by weight, for each 100 parts by weight of the reactive silyl group-containing polyether polymer (A). If the amount of condensation catalyst is less than 0.001 parts by weight, the curing rate may be insufficient, which may make it difficult to allow the curing reaction to proceed sufficiently. Conversely, if the amount of condensation catalyst exceeds 20 parts by weight, the working life of the curable composition is likely to be shortened due to too rapid a curing rate and thus the workability tends to be poor; moreover, the storage stability tends to be poor.

The curable composition of the present invention may optionally contain a plasticizer, an adhesion-imparting agent, a filler, a physical-property modifier, an anti-sagging agent (thixotropy-imparting agent), a stabilizer, etc.

The curable composition of the present invention may contain a plasticizer. Addition of a plasticizer enables to adjust the viscosity and slump properties of the curable composition, and the mechanical properties such as tensile strength and elongation of a cured product obtained by curing the curable composition. Specific examples of the plasticizer include: phthalate compounds such as dibutyl phthalate, diisononyl phthalate (DINP), diheptyl phthalate, di(2-ethylhexyl) phthalate, diisodecyl phthalate (DIDP), and butyl benzyl phthalate; terephthalate compounds such as bis(2-ethylhexyl)-1,4-benzene dicarboxylate (specifically, product name: EASTMAN 168 (product of Eastman Chemical Company)); non-phthalate compounds such as 1,2-cyclohexanedicarboxylic acid diisononyl ester (specifically, product name: Hexamoll DINCH (product of BASF)); aliphatic polycarboxylate compounds such as dioctyl adipate, dioctyl sebacate, dibutyl sebacate, diisodecyl succinate, and tributyl acetylcitrate; unsaturated fatty acid ester compounds such as butyl oleate and methyl acetylricinoleate; alkylsulfonic acid phenyl esters (specifically, product name: Mesamoll (product of Lanxess)); phosphate compounds such as tricresyl phosphate and tributyl phosphate; trimellitate compounds; chlorinated paraffins; hydrocarbon oils such as alkyldiphenyls and partially hydrogenated terphenyls; process oils; and epoxy plasticizers such as epoxidized soybean oil and benzyl epoxystearate.

Also, polymer plasticizers may be used. In the case of using a polymer plasticizer, the initial physical properties can be maintained for a long period of time, compared with the case of using a low-molecular-weight plasticizer which is a plasticizer containing no polymer moiety in the molecule. The drying properties (coating properties) of an alkyd coating material applied to the resulting cured product can also be improved. Specific examples of the polymer plasticizer include, but not limited to, vinyl polymers obtained by polymerizing vinyl monomers by various methods; esters of polyalkylene glycols, such as diethylene glycol dibenzoate, triethylene glycol dibenzoate, and pentaerythritol esters; polyester plasticizers obtained from dibasic acids (e.g., sebacic acid, adipic acid, azelaic acid, phthalic acid) and divalent alcohols (e.g., ethylene glycol, diethylene glycol, triethylene glycol, propylene glycol, dipropylene glycol); polyethers such as polyether polyols with a number average molecular weight of 500 or higher, or even 1000 or higher (e.g., polyethylene glycol, polypropylene glycol, polytetramethylene glycol) and their derivatives obtained by replacing the hydroxy group of these polyether polyols with an ester group, ether group or the like; polystyrenes such as polystyrene and poly-α-methylstyrene; polybutadiene, polybutene, polyisobutylene, polybutadiene-acrylonitrile, and polychloroprene.

Preferred among these polymer plasticizers are ones compatible with the reactive silyl group-containing polyether polymer (A), and the reactive silyl group-containing polyether polymer (B) and/or the reactive silyl group-containing (meth)acrylic polymer (C). In this respect, polyethers and vinyl polymers are preferred. Use of polyethers as plasticizers is preferred because the surface curability and depth curability are then improved and curing retardation will not occur after storage. Among these, polypropyrene glycol is more preferred. In terms of compatibility, weather resistance, and heat resistance, vinyl polymers are preferred. Among vinyl polymers, acrylic polymers and/or methacrylic polymers are preferred, and acrylic polymers such as polyalkyl acrylates are more preferred. The polymers may preferably be synthesized by living radical polymerization, more preferably by atom transfer radical polymerization, because these methods allow production of polymers having a narrow molecular weight distribution and low viscosity. Also preferred are polymers produced by the so-called SGO process in which alkyl acrylate monomers are continuously bulk-polymerized under high-temperature and high-pressure conditions, as disclosed in JP-A 2001-207157.

The number average molecular weight of the polymer plasticizer is preferably 500 to 15,000, more preferably 800 to 10,000, still more preferably 1,000 to 8,000, particularly preferably 1,000 to 5,000, and most preferably 1,000 to 3,000. If the molecular weight is too low, the plasticizer exudes due to heat or rain over time and therefore the initial physical properties cannot be maintained for a long period of time. If the molecular weight is too high, the viscosity becomes high and the workability is thus deteriorated.

The molecular weight distribution of the polymer plasticizer is not particularly limited, and is preferably narrow; the molecular weight distribution is preferably less than 1.80, more preferably 1.70 or less, still more preferably 1.60 or less, even more preferably 1.50 or less, particularly preferably 1.40 or less, and most preferably 1.30 or less.

The number average molecular weight of the polymer plasticizer is measured by the GPC method in the case of a vinyl polymer, or by terminal group analysis in the case of a polyether polymer. Also, the molecular weight distribution (Mw/Mn) is measured by the GPC method (on the polystyrene equivalent basis).

The polymer plasticizer may or may not contain a reactive silyl group. If the polymer plasticizer contains a reactive silyl group, the polymer plasticizer functions as a reactive plasticizer, so that transfer of the plasticizer from the cured product can be prevented. If the polymer plasticizer contains a reactive silyl group, the number of reactive silyl groups is preferably 1 or less, and more preferably 0.8 or less, on average per molecule. In the case of using a reactive silyl group-containing plasticizer, particularly a reactive silyl group-containing polyether polymer, the number average molecular weight thereof needs to be lower than that of the reactive silyl group-containing polyether polymer (A).

The amount of plasticizer is 5 to 150 parts by weight, preferably 10 to 120 parts by weight, and more preferably 20 to 100 parts by weight, for each 100 parts by weight in total of the reactive silyl group-containing polyether polymer (A), and the reactive silyl group-containing polyether polymer (B) and/or the reactive silyl group-containing (meth)acrylic polymer (C). If the amount is less than 5 parts by weight, the effects of the plasticizer cannot be obtained. If the amount is more than 150 parts by weight, the mechanical strength of the cured product is insufficient. One plasticizer may be used alone, or two or more plasticizers may be used in combination. Also, a low-molecular-weight plasticizer and a polymer plasticizer may be used in combination. Moreover, the plasticizer may be added at the time of polymer production.

The curable composition of the present invention may further incorporate a silane coupling agent, a reaction product of a silane coupling agent, or a compound other than silane coupling agents as an adhesion-imparting agent. Specific examples of the silane coupling agent include: isocyanato group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, α-isocyanatomethyltrimethoxysilane, and α-isocyanatomethyldimethoxymethylsilane; amino group-containing silanes such as γ-aminopropyltrimethoxysilane, γ-aminopropyltriethoxysilane, γ-aminopropylmethyldimethoxysilane, γ-aminopropylmethyldiethoxysilane, N-β-aminoethyl-γ-aminopropyltrimethoxysilane, N-β-aminoethyl-γ-aminopropylmethyldimethoxysilane, N-β-aminoethyl-γ-aminopropyltriethoxysilane, N-β-aminoethyl-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis ((3-methoxyethoxy)silane, and N-β-(carboxymethyl)aminoethyl-γ-aminopropyltrimethoxysilane; vinyl unsaturated group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanurate silanes such as tris (trimethoxysilyl)isocyanurate. Moreover, derivatives obtained by modifying these, for example, amino-modified silyl polymers, silylated amino polymers, unsaturated aminosilane complexes, phenylamino long-chain alkylsilanes, aminosilylated silicones, and silylated polyesters, may be used as the silane coupling agent. The silane coupling agent that can be used in the present invention is preferably used in the range of 0.1 to 20 parts by weight, particularly preferably in the range of 0.5 to 10 parts by weight, for each 100 parts by weight in total of the reactive silyl group-containing polyether polymer (A), and the reactive silyl group-containing polyether polymer (B) and/or the reactive silyl group-containing (meth)acrylic polymer (C).

The curable composition of the present invention may further incorporate various fillers. Examples of the fillers include reinforcing fillers such as fumed silica, precipitated silica, crystalline silica, fused silica, dolomite, silicic anhydride, hydrous silicic acid, and carbon black; fillers such as heavy calcium carbonate, colloidal calcium carbonate, magnesium carbonate, diatomite, calcined clay, clay, talc, titanium oxide, bentonite, organic bentonite, ferric oxide, fine aluminum powder, flint powder, zinc oxide, activated zinc white, and resin powders including PVC powder and PMMA powder; and fibrous fillers such as asbestos, glass fiber, and filaments. In the case of using the filler, the amount thereof is 1 to 300 parts by weight, preferably 10 to 200 parts by weight, for each 100 parts by weight in total of the reactive silyl group-containing polyether polymer (A), and the reactive silyl group-containing polyether polymer (B) and/or the reactive silyl group-containing (meth)acrylic polymer (C).

In order to obtain a cured product having higher strength by the use of such a filler, the filler is preferably selected mainly from fumed silica, precipitated silica, crystalline silica, fused silica, dolomite, silicic anhydride, hydrous silicic acid, carbon black, surface-treated fine calcium carbonate, calcined clay, clay, activated zinc white and the like. This filler provides favorable results when its amount used is in the range of 1 to 200 parts by weight for each 100 parts by weight in total of the reactive silyl group-containing polyether polymer (A), and the reactive silyl group-containing polyether polymer (B) and/or the reactive silyl group-containing (meth)acrylic polymer (C). In order to obtain a cured product having low strength and high elongation at break, a filler mainly selected from titanium oxide, calcium carbonate, magnesium carbonate, talc, ferric oxide, zinc oxide, shirasu balloons and the like is used in the range of 5 to 200 parts by weight for each 100 parts by weight in total of the reactive silyl group-containing polyether polymer (A), and the reactive silyl group-containing polyether polymer (B) and/or the reactive silyl group-containing (meth)acrylic polymer (C), which provides favorable results.

Generally, calcium carbonate with a greater specific surface area has a larger effect in improving the tensile strength at break, elongation at break, and adhesion of the cured product. Of course each of these fillers may be used alone, or two or more of these may be used in admixture. Colloidal calcium carbonate surface-treated with fatty acid may be used in combination with calcium carbonate having a particle size of 1 µm or greater, such as heavy calcium carbonate that is not surface-treated.

The curable composition of the present invention may further contain hollow spheres such as balloons for the purpose of reducing the weight (or specific gravity) of the composition.

Balloons are spherical fillers having a hollow inside. Examples of the material of the balloons include, but not limited to, inorganic materials such as glass, shirasu, and silica; and organic materials such as phenolic resin, urea resin, polystyrene, Saran and acrylnitrile. An inorganic material and an organic material may be formed into a composite or may be layered to form a multilayer. Inorganic, organic, or their composite balloons may be used. Also, a single type of balloons may be used, or a mixture of multiple types of balloons made of different materials may be used. Moreover, the surface of balloons to be used may be processed or coated, or may be treated with various surface treating agents. For example, organic balloons may be coated with calcium carbonate, talc, titanium oxide, or the like, or inorganic balloons may be surface-treated with a silane coupling agent.

The particle size of balloons is preferably 3 to 200 µm, and particularly preferably 10 to 110 µm. Balloons having a particle size less than 3 µm make a small contribution to the weight reduction and thus need to be added in large amounts. Balloons having a particle size of 200 µm or greater are likely to make the surface of the cured sealing material irregular, and to reduce the elongation.

In the case of using balloons, it is possible to add the following: an anti-slip agent as described in JP-A 2000-154368, and an amine compound for giving a matte appearance as well as an irregular appearance to the surface of the cured product, particularly a primary and/or secondary amines with a melting point of 35° C. or higher, as described in JP-A 2001-164237.

Specific examples of the balloons include ones described in JP-A H02-129262, JP-A H04-8788, JP-A H04-173867, JP-A H05-1225, JP-A H07-113073, JP-A H09-53063, JP-A H10-251618, JP-A 2000-154368, JP-A 2001-164237, and WO 97/05201.

The amount of hollow spheres is preferably 0.01 to 30 parts by weight for each 100 parts by weight in total of the reactive silyl group-containing polyether polymer (A), and the reactive silyl group-containing polyether polymer (B) and/or the reactive silyl group-containing (meth)acrylic polymer (C). The lower limit thereof is more preferably 0.1 parts by weight, and the upper limit is more preferably 20 parts by weight. Less than 0.01 parts by weight of hollow spheres are unlikely to be effective in improving the workability. More than 30 parts by weight of hollow spheres are likely to decrease the elongation and the tensile strength at break of the cured product.

The curable composition of the present invention may optionally incorporate a physical-property modifier in order to adjust the tensile properties of a cured product to be obtained. Examples of the physical-property modifier include, but not limited to: alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane, methyltriisopropenoxysilane, and γ-glycidoxypropylmethyldiisopropenoxysilane; functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-β-aminoethyl-γ-aminopropylmethyldimethoxysilane, γ-mercaptopropyltrimethoxysilane, and γ-mercaptopropylmethyldimethoxysilane; silicone varnishes; and polysiloxanes. Use of the physical-property modifier can increase the hardness of the cured composition in the present invention or, conversely, decrease the hardness to offer elongation at break. Each of the physical-property modifiers may be used alone, or two or more of these may be used in combination.

In particular, compounds that generate a compound containing a monovalent silanol group in the molecule by hydrolysis serve to decrease the modulus of the cured product without deteriorating the stickiness of the surface of the cured product. Particularly preferred are compounds generating trimethylsilanol. Examples of the compounds that generate a compound containing a monovalent silanol group in the molecule by hydrolysis include compounds disclosed in JP-A H05-117521. Other examples include compounds that are derivatives of alkyl alcohols such as hexanol, octanol, and decanol, and generate a silicon compound generating a trialkylsilanol such as trimethylsilanol by hydrolysis; and compounds that are derivatives of polyalcohols having three or more hydroxy groups such as trimethylolpropane, glycerol, pentaerythritol, and sorbitol, and generate a silicon compound generating a trialkylsilanol such as trimethylsilanol by hydrolysis, as disclosed in JP-A H11-241029.

Other examples also include compounds that are derivatives of oxyalkylene polymers and generate a silicon compound generating a trialkylsilanol such as trimethylsilanol by hydrolysis, as disclosed in JP-A H07-258534; and polymers that contain a hydrolyzable silyl group that can be cross-linked and a silyl group that can form a monosilanol-containing compound by hydrolysis, as disclosed in JP-A H06-279693.

The physical-property modifier is used in the range of 0.1 to 20 parts by weight, preferably 0.5 to 10 parts by weight, for each 100 parts by weight in total of the reactive silyl group-containing polyether polymer (A), and the reactive silyl group-containing polyether polymer (B) and/or the reactive silyl group-containing (meth)acrylic polymer (C).

The curable composition of the present invention may optionally incorporate an anti-sagging agent to prevent sagging and improve the workability. Examples of the anti-sagging agent include, but not limited to, polyamide waxes, hydrogenated castor oil derivatives, and metal soaps such as calcium stearate, aluminum stearate, and barium stearate. Each of these anti-sagging agents may be used alone, or two or more of these may be used in combination.

The anti-sagging agent is used in the range of 0.1 to 20 parts by weight for each 100 parts by weight in total of the reactive silyl group-containing polyether polymer (A), and the reactive silyl group-containing polyether polymer (B) and/or the reactive silyl group-containing (meth)acrylic polymer (C).

The curable composition of the present invention may contain an antioxidant (age resistor). Use of an antioxidant enhances the weather resistance of the cured product. Examples of the antioxidant include hindered phenol antioxidants, monophenol antioxidants, bisphenol antioxidants, and polyphenol antioxidants. Particularly preferred are hindered phenol antioxidants. Similarly, the following hindered amine light stabilizers can be used: Tinuvin 622LD, Tinuvin 144; CHIMASSORB 944LD, and CHIMASSORB 119FL (all are products of Ciba Japan); ADK STAB LA-57, ADK STAB LA-62, ADK STAB LA-67, ADK STAB LA-63, and ADK STAB LA-68 (all are products of ADEKA Corporation); and SANOL LS-770, SANOL LS-765, SANOL LS-292, SANOL LS-2626, SANOL LS-1114, and SANOL LS-744 (all are products of Sankyo Lifetech Co., Ltd.). Specific examples of the antioxidant also include ones disclosed in JP-A H04-283259 and JP-A H09-194731.

The amount of antioxidant is preferably 0.1 to 10 parts by weight, and more preferably 0.2 to 5 parts by weight, for each 100 parts by weight in total of the reactive silyl group-containing polyether polymer (A), and the reactive silyl group-containing polyether polymer (B) and/or the reactive silyl group-containing (meth)acrylic polymer (C).

The curable composition of the present invention may contain a light stabilizer. Use of a light stabilizer enables to prevent photooxidative degradation of the cured product. Examples of the light stabilizer include benzotriazole compounds, hindered amine compounds, and benzoate compounds. Particularly preferred are hindered amine compounds.

The amount of light stabilizer is preferably 0.1 to 10 parts by weight, and more preferably 0.2 to 5 parts by weight, for each 100 parts by weight in total of the reactive silyl group-containing polyether polymer (A), and the reactive silyl group-containing polyether polymer (B) and/or the reactive silyl group-containing (meth)acrylic polymer (C). Specific examples of the light stabilizer include ones described in JP-A H09-194731.

In the case that the curable composition of the present invention contains a photo-curable substance, particularly an unsaturated acrylic compound, then a tertiary amine-containing hindered amine light stabilizer is preferably used as the hindered amine light stabilizer in terms of improving the storage stability of the composition, as taught in JP-A H05-70531. Examples of the tertiary amine-containing hindered amine light stabilizer include Tinuvin 622LD, Tinuvin 144, and CHIMASSORB 119FL (all are products of Ciba Japan); ADK STAB LA-57, LA-62, LA-67, and LA-63 (all are products of ADEKA Corporation); and SANOL LS-765, LS-292, LS-2626, LS-1114, and LS-744 (all are products of Sankyo Lifetech Co., Ltd.).

The curable composition of the present invention may contain an ultraviolet absorber. Use of an ultraviolet absorber enables to increase the surface weather resistance of the cured product. Examples of the ultraviolet absorber include benzophenone compounds, benzotriazole compounds, salicylate compounds, substituted tolyl compounds, and metal chelate compounds. Particularly preferred are benzotriazole compounds.

The amount of ultraviolet absorber is preferably 0.1 to 10 parts by weight, and more preferably 0.2 to 5 parts by weight, for each 100 parts by weight in total of the reactive silyl group-containing polyether polymer (A), and the reactive silyl group-containing polyether polymer (B) and/or the reactive silyl group-containing (meth)acrylic polymer (C). It is preferable to use a phenol or hindered phenol antioxidant, a hindered amine light stabilizer, and a benzotriazole ultraviolet absorber in combination.

The curable composition of the present invention may optionally incorporate various additives for the adjustment of physical properties of the curable composition or cured product. Examples of the additives include flame retardants, curability modifiers, radical inhibitors, metal deactivators, antiozonants, phosphorus-containing peroxide decomposers, lubricants, pigments, blowing agents, solvents, and antifungal agents. Each of these various additives may be used alone, or two or more of these may be used in combination. Specific examples of additives other than the ones mentioned herein are described in, for example, JP-B H04-69659, JP-B H07-108928, JP-A S63-254149, JP-A S64-22904, and JP-A 2001-72854.

The curable composition of the present invention can be prepared as a one-pack curable composition which is prepared by compounding all the formulation components and storing the resulting composition in a hermetically closed vessel in advance, and after application, is curable by moisture in the air. Also, the curable composition can be prepared as a two-pack curable composition which separately includes components to be mixed with each other prior to application, namely a polymer composition and a mixture as curing agent that is separately prepared by mixing components including a curing catalyst, filler, plasticizer, and water.

In the case of preparing a one-pack curable composition, since all the formulation components are mixed in advance, it is preferable that formulation components containing water be dehydrated and dried prior to application, or be dehydrated, for example, under reduced pressure during the mixing and kneading. In the case of preparing a two-pack curable composition, since a curing catalyst is not required to be mixed in the base mixture including the reactive silyl group-containing organic polymers, the base mixture is less likely to be gelled even if a small amount of water is left; still, if long-term storage stability is required, it is preferable that the formulation components be dehydrated and dried. Preferred examples of the dehydrating and drying method include heat drying in the case that the formulation components are solids such as powder; and vacuum dehydration or dehydration using a substance such as synthetic zeolite, active alumina, and silica gel in the case that the formulation components are liquids. Also, the composition may be mixed with a small amount of an isocyanato compound so that the isocyanato group and water are reacted for dehydration. The storage stability can be further improved by, in addition to performing the dehydrating and drying method mentioned above, adding a lower alcohol such as methanol and ethanol; or an alkoxysilane compound such as n-propyltrimethoxysilane, vinyltrimethoxysilane, vinylmethyldimethoxysilane, γ-mercaptopropylmethyldimethoxysilane, γ-mercaptopropylmethyldiethoxysilane, and γ-glycidoxypropyltrimethoxysilane.

The amount of dehydrating agent, particularly a silicon compound reactive with water, such as vinyltrimethoxysilane, is 0.1 to 20 parts by weight, preferably 0.5 to 10 parts by weight, for each 100 parts by weight in total of the reactive silyl group-containing polyether polymer (A), and the reactive silyl group-containing polyether polymer (B) and/or the reactive silyl group-containing (meth)acrylic polymer (C).

The curable composition of the present invention can be used in various applications such as floor adhesives; coating agents; pressure-sensitive adhesives; impression materials; vibration-proof materials; damping materials; soundproof materials; expanded/foamed materials; coating compositions; spray coatings; electric and electronic part materials (e.g. solar cell backside sealants); electrical insulating materials (e.g. insulating coating materials for electric wires and cables); elastic adhesives; contact adhesives; spray sealants; crack repair materials; tiling adhesives; powder coating compositions; casting materials; rubber materials for medical use; pressure-sensitive adhesives for medical use; sealing materials for medical devices; food packaging materials; joint sealing materials for siding boards and other exterior materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated-glass edges (cut end faces); and liquid sealants for use in automotive parts, electrical machinery parts, various machinery parts, and the like. Furthermore, the curable composition may also be used as various sealing compositions and adhesive compositions because it, either alone or with the aid of a primer, can adhere to a wide range of substrates such as glass, ceramics, wood, metals, and resin moldings. In addition, the curable composition of the present invention may also be used as adhesives for interior panels, adhesives for exterior panels, stone pitching adhesives, ceiling finishing adhesives, floor finishing adhesives, wall finishing adhesives, vehicle panel adhesives, and adhesives for electric/electronic/precision device assembling.

EXAMPLES

Hereinafter, the present invention will be described in more detail with reference to specific examples. They are, however, by no means limitative of the scope of the present invention.

Chloromethyldimethoxysilane used in the following synthesis examples was synthesized by synthesizing chloromethyldichlorosilane by the method described in Example 41 of WO2010/004948 and methoxylating the compound by the method described in Example 55 thereof.

Synthesis Example 1

Propylene oxide was polymerized in the presence of polyoxypropylene diol having a molecular weight of about 2,000 as an initiator and a zinc hexacyanocobaltate glyme complex catalyst to provide polyoxypropylene diol having a number average molecular weight of 21,100 (polystyrene-equivalent molecular weight determined with a solvent delivery system: HLC-8120 GPC produced by TOSOH; a column: TSK-GEL H type produced by TOSOH; and a solvent: THF). To this polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 72 ppm of a platinum-divinyldisiloxane complex (isopropanol solution having a platinum content of 3% by weight) and 1.29 parts by weight of trimethyl orthoformate and then gradually added dropwise 1.51 parts of (chloromethyl)dimethoxysilane with stirring. The mixed solution was reacted at 90° C. for 2 hours to provide a chloromethyldimethoxysilyl-terminated linear polyoxypropylene polymer (A-1) containing 1.5 reactive silyl groups on average per molecule and having a number average molecular weight of 21,100.

Synthesis Example 2

Propylene oxide was polymerized in the presence of polyoxypropylene diol having a molecular weight of about 2,000 as an initiator and a zinc hexacyanocobaltate glyme complex catalyst to provide polyoxypropylene diol having a number average molecular weight of 28,500 (calculated in the same way as in Synthesis Example 1). To this polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 72 ppm of a platinum-divinyldisiloxane complex (isopropanol solution having a platinum content of 3% by weight) and 1.05 parts by weight of trimethyl orthoformate and then gradually added dropwise 1.22 parts of (chloromethyl)dimethoxysilane with stirring. The mixed solution was reacted at 90° C. for 2 hours to provide a (chloromethyl)dimethoxysilyl-terminated linear polyoxypropylene polymer (A-2) containing 1.5 reactive silyl groups on average per molecule and having a number average molecular weight of 28,500.

Synthesis Example 3

Propylene oxide was polymerized in the presence of polyoxypropylene triol having a number average molecular weight of about 3,000 as an initiator and a zinc hexacyanocobaltate glyme complex catalyst to provide polyoxypropylene triol having a number average molecular weight of 26,200 (calculated in the same way as in Synthesis Example 1). To this polyoxypropylene triol was then added a methanol solution of NaOMe in an amount of 1.2 equivalents relative to the hydroxy groups of the polyoxypropylene triol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 72 ppm of a platinum-divinyldisiloxane complex (isopropanol solution having a platinum content of 3% by weight) and 0.79 parts by weight of trimethyl orthoformate and then gradually added dropwise 1.83 parts by weight of (chloromethyl)dimethoxysilane with stirring. The mixed solution was reacted at 90° C. for 2 hours to provide a chloromethyl dimethoxysilyl-terminated branched polyoxypropylene polymer (A-3) containing 2.3 reactive silyl groups on average per molecule and having a number average molecular weight of 26,200.

Synthesis Example 4

Propylene oxide was polymerized in the presence of polyoxypropylene diol having a number average molecular weight of about 2,000 as an initiator and a zinc hexacyanocobaltate glyme complex catalyst to provide polyoxypropylene diol having a number average molecular weight of 14,600 (calculated in the same way as in Synthesis Example 1). To this polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 72 ppm of a platinum-divinyldisiloxane complex (isopropanol solution having a platinum content of 3% by weight) and 2.01 parts by weight of trimethyl orthoformate and then was gradually added dropwise 2.35 parts by weight of (chloromethyl)dimethoxysilane with stirring. The mixed solution was reacted at 90° C. for 2 hours to provide a (chloromethyl)dimethoxysilyl-terminated linear polyoxypropylene polymer (A-4) containing 1.5 reactive silyl groups on average per molecule and having a number average molecular weight of 14,600.

Synthesis Example 5

Acetyl chloride (4 molar equivalents) was allowed to act on (methoxymethyl)trimethoxysilane produced with reference to the method described in Example 2 of JP-T 2007-513203, in the presence of 0.02 molar equivalent of zinc chloride as a catalyst. (Methoxymethyl)trichlorosilane was synthesized by reaction for 36 hours under reflux conditions by heating.

(Methoxymethyl)trichlorosilane purified by distillation was mixed with 1 molar equivalent of methyldichlorosilane (LS-50, a product of Shin-Etsu Chemical Co., Ltd.). To the mixture was then added 0.05 molar equivalent of methyl tributylammonium chloride. The mixture was then allowed to react for 3 hours under reflux conditions by heating. As a result, methoxymethyldichlorosilane was obtained at a conversion rate of about 50%.

To a reaction vessel was added trimethyl orthoacetate in an amount of 2.5 molar equivalents relative to (methoxymethyl) dichlorosilane purified by distillation, and was further gradually added (methoxymethyl)dichlorosilane with sufficient stirring. The addition rate was adjusted so as to keep the reaction solution at a temperature of not higher than 50° C. After the completion of addition, it was confirmed from $^1$H-NMR spectra (measured in a CDCl$_3$ solvent with JNM-LA400 produced by JEOL Ltd.; analysis was conducted with the peak of CHCL$_3$ as 7.26 ppm) that (methoxymethyl)dichlorosilane was almost quantitatively converted to (methoxymethyl)dimethoxysilane. The resultant was purified by distillation under reduced pressure to obtain (methoxymethyl)dimethoxysilane.

$^1$HNMR spectral assignment: δ4.52 (t, 1H), 3.60 (s, 6H), 3.35 (s, 3H), 3.19 (d, 2H).

Synthesis Example 6

Propylene oxide was polymerized in the presence of polyoxypropylene diol having a number average molecular weight of about 2,000 as an initiator and a zinc hexacyanocobaltate glyme complex catalyst to provide polyoxypropylene diol having a number average molecular weight of 14,600 (calculated in the same way as in Synthesis Example 1). To this hydroxy-terminated polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 72 ppm of a platinum-divinyldisiloxane complex (isopropanol solution having a platinum content of 3% by weight) and 2.01 parts by weight of trimethyl orthoformate and then was gradually added dropwise 2.28 parts by weight of (methoxymethyl)dimethoxysilane synthesized in Synthesis Example 5 with stirring. The mixed solution was reacted at 90° C. for 2 hours to provide a (methoxymethyl)dimethoxysilyl-terminated linear polyoxypropylene polymer (A-5) containing 1.5 reactive silyl groups on average per molecule and having a number average molecular weight of 14,600.

Synthesis Example 7

A reactor was charged with 71.1 g (0.88 mol) of potassium cyanate and purged with nitrogen. To the reactor were added 500 ml of N,N-dimethylformamide and then 125.0 g (0.75 mol) of chloromethyl-dimethoxymethylsilane and 50.2 g (1.56 mol) of methanol while the mixture was sufficiently stirred. The resulting mixture was heated to 90° C., then heated to 120° C. over 4 hours, and further stirred for 3 hours. The deposited potassium chloride was filtered off, and the N,N-dimethylformamide was distilled off using an evaporator. The residue was then purified by distillation to provide methyl(N-dimethoxymethylsilylmethyl)carbamate (MeCO$_2$NH—CH$_2$—Si(OMe)$_2$Me) (yield: 116.2 g).

A reactor connected with a fractionating column and a condenser was charged with 100 g (0.52 mol) of the obtained methyl(N-dimethoxymethylsilylmethyl)carbamate and 13 mg (0.002 mmol) of dibutyltin dilaurate, and the pressure in the system was reduced to 45 mmHg. The mixture was heated to 170° C. While the degradation reaction product methanol was separated and collected, (isocyanatomethyl) dimethoxymethylsilane (OCN—CH$_2$—SiCH$_3$(OCH$_3$)$_2$) was synthesized over 5 hours. The resultant was purified by distillation under reduced pressure to obtain (isocyanatomethyl) dimethoxymethylsilane (yield: 50 g).

Synthesis Example 8

Propylene oxide was polymerized in the presence of polyoxypropylene diol having a number average molecular weight of about 2,000 as an initiator and a zinc hexacyanocobaltate glyme complex catalyst to provide polyoxypropylene diol having a number average molecular weight of 14,600 (calculated in the same way as in Synthesis Example 1). To 100 parts by weight of the obtained polyoxypropylene diol was added 30 ppm of dibutyltin dilaurate and was then gradually added dropwise (isocyanatomethyl)dimethoxymethylsilane (3.1 parts by weight) synthesized in Synthesis Example 7 with stirring. The mixed solution was reacted at 90° C. for 3 hours and then deaerated for 2 hours to provide a dimethoxymethylsilyl-terminated linear polyoxypropylene polymer (A-6) containing 1.8 reactive silyl groups on average per molecule and having a number average molecular weight of 14,600.

Synthesis Example 9

Propylene oxide was polymerized in the presence of polyoxypropylene diol having a number average molecular weight of about 2,000 as an initiator and a zinc hexacyanocobaltate glyme complex catalyst to provide polyoxypropylene diol having a number average molecular weight of 28,500 (calculated in the same way as in Synthesis Example 1). To the obtained polyoxypropylene diol was then added a methanol solution of NaOMe in an amount of 1.2 equivalents relative to the hydroxy groups of the polyoxypropylene diol, and the methanol was distilled off. 3-Chloro-2-methyl-1-propene was then added to the residue, and thereby the terminal hydroxy group was converted to a methallyl group. The container was then purged with 6% $O_2/N_2$. To 100 parts by weight of the obtained methallyl-terminated polyoxypropylene polymer were then added 100 ppm of sulfur (0.25 wt % solution in hexane), 100 ppm of a platinum-divinyldisiloxane complex (isopropanol solution having a platinum content of 3% by weight), and 1.37 parts by weight of trimethyl orthoformate and then gradually added dropwise 1.60 parts by weight of (chloromethyl)dimethoxysilane with stirring. The mixed solution was reacted at 100° C. for 5 hours to provide a (chloromethyl)dimethoxysilyl-terminated linear polyoxypropylene polymer (A-7) containing 1.9 reactive silyl groups on average per molecule and having a number average molecular weight of 28,500.

Synthesis Example 10

Propylene oxide was polymerized in the presence of butanol as an initiator and a zinc hexacyanocobaltate glyme complex catalyst to provide polyoxypropylene oxide having a number average molecular weight of 7,000 (calculated in the same way as in Synthesis Example 1). To this hydroxy-terminated polyoxypropylene oxide was then added a methanol solution of NaOMe in an amount of 1.2 equivalents relative to the hydroxy groups of the hydroxy-terminated polyoxypropylene oxide, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 72 ppm of a platinum-divinyldisiloxane complex (isopropanol solution having a platinum content of 3% by weight), and 1.95 parts by weight of trimethyl orthoformate and then gradually added dropwise 2.28 parts by weight of (chloromethyl)dimethoxysilane with stirring. The mixed solution was reacted at 90° C. for 2 hours to provide a chloromethyldimethoxysilyl-terminated linear polyoxypropylene polymer (A-8) containing 0.7 reactive silyl groups on average per molecule and having a number average molecular weight of 7,000.

Synthesis Example 11

Propylene oxide was polymerized in the presence of polyoxypropylene diol having a number average molecular weight of about 2,000 as an initiator and a zinc hexacyanocobaltate glyme complex catalyst to provide polyoxypropylene diol having a number average molecular weight of 7,200 (calculated in the same way as in Synthesis Example 1). To the obtained polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 72 ppm of a platinum-divinyldisiloxane complex (isopropanol solution having a platinum content of 3% by weight), and 3.83 parts by weight of trimethyl orthoformate and then gradually added dropwise 4.49 parts by weight of (chloromethyl)dimethoxysilane with stirring. The mixed solution was reacted at 90° C. for 2 hours to provide a (chloromethyl)dimethoxysilyl-terminated linear polyoxypropylene polymer (A-9) containing 1.5 reactive silyl groups on average per molecule and having a number average molecular weight of 7,400.

Synthesis Example 12

Propylene oxide was polymerized in the presence of polyoxypropylene diol having a molecular weight of about 2,000 as an initiator and a zinc hexacyanocobaltate glyme complex catalyst to provide polyoxypropylene diol having a number average molecular weight of 21,100 (calculated in the same way as in Synthesis Example 1). To the obtained polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer was added 36 ppm of a platinum-divinyldisiloxane complex (isopropanol solution having a platinum content of 3% by weight), and was then gradually added dropwise 1.15 parts by weight of dimethoxymethylsilane with stirring. The mixed solution was reacted at 90° C. for 2 hours to provide a dimethoxymethylsilyl-terminated linear polyoxypropylene polymer (B-1) containing 1.5 reactive silyl groups on average per molecule and having a number average molecular weight of 21,100.

Synthesis Example 13

Propylene oxide was polymerized in the presence of polyoxypropylene diol having a molecular weight of about 2,000 as an initiator and a zinc hexacyanocobaltate glyme complex catalyst to provide polyoxypropylene diol having a number average molecular weight of 28,500 (calculated in the same way as in Synthesis Example 1). To the obtained polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 36 ppm of a platinum-divinyldisiloxane complex (isopropanol solution having a platinum content of 3% by weight), and then gradually added dropwise 0.96 parts by weight of dimethoxymethylsilane with stirring. The mixed solution was reacted at 90° C. for 2 hours to provide a dimethoxymethylsilyl-terminated linear polyoxypropylene polymer (B-2) containing 1.5 reactive silyl groups on average per molecule and having a number average molecular weight of 28,500.

Synthesis Example 14

Propylene oxide was polymerized in the presence of polyoxypropylene triol having a number average molecular weight of about 3,000 as an initiator and a zinc hexacyanocobaltate glyme complex catalyst to provide polyoxypropylene triol having a number average molecular weight of 26,200 (calculated in the same way as in Synthesis Example 1). To the obtained polyoxypropylene triol was then added a methanol solution of NaOMe in an amount of 1.2 equivalents relative to the hydroxy groups of the polyoxypropylene triol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 36 ppm of a platinum-divinyldisiloxane complex (isopropanol solution having a platinum content of 3% by weight), and then gradually added dropwise 1.29 parts by weight of dimethoxymethylsilane with stirring. The mixed solution was reacted at 90° C. for 2 hours to provide a dimethoxymethylsilyl-terminated branched polyoxypropylene polymer (B-3) containing 2.3 reactive silyl groups on average per molecule and having a number average molecular weight of 26,200.

Synthesis Example 15

Propylene oxide was polymerized in the presence of polyoxypropylene diol having a number average molecular weight of about 2,000 as an initiator and a zinc hexacyanocobaltate glyme complex catalyst to provide polyoxypropylene diol having a number average molecular weight of 28,500 (calculated in the same way as in Synthesis Example 1). To the obtained polyoxypropylene diol was then added a methanol solution of NaOMe in an amount of 1.2 equivalents relative to the hydroxy groups of the polyoxypropylene diol, and the methanol was distilled off. 3-Chloro-2-methyl-1-propene was then added to the residue, and thereby the terminal hydroxy group was converted to a methallyl group. The container was then purged with 6% $O_2/N_2$. To 100 parts by weight of the obtained methallyl-terminated polyoxypropylene polymer were then added 100 ppm of sulfur (0.25 wt % solution in hexane), 100 ppm of a platinum-divinyldisiloxane complex (isopropanol solution having a platinum content of 3% by weight), and then gradually added dropwise 2.30 parts by weight of dimethoxymethylsilane with stirring. The mixed solution was reacted at 100° C. for 5 hours to provide a dimethoxymethylsilyl-terminated linear polyoxypropylene polymer (B-4) containing 1.9 reactive silyl groups on average per molecule and having a number average molecular weight of 28,500.

Synthesis Example 16

Propylene oxide was polymerized in the presence of polyoxypropylene diol having a number average molecular weight of about 2,000 as an initiator and a zinc hexacyanocobaltate glyme complex catalyst to provide polyoxypropylene diol having a number average molecular weight of 28,500 (calculated in the same way as in Synthesis Example 1). To the obtained polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer was added 36 ppm of a platinum-divinyldisiloxane complex (isopropanol solution having a platinum content of 3% by weight) and was then gradually added dropwise TES (triethoxysilane) (1.48 parts by weight) with stirring. The mixed solution was reacted at 90° C. for 2 hours. Then 20 parts by weight of methanol and 12 ppm of HCl were further added to the reaction solution, and thereby the terminal ethoxy group was converted to a methoxy group to provide a trimethoxysilyl-terminated linear polyoxypropylene polymer (B-5) containing 1.6 reactive silyl groups on average per molecule and having a number average molecular weight of 28,500.

Synthesis Example 17

Propylene oxide was polymerized in the presence of butanol as an initiator and a zinc hexacyanocobaltate glyme complex catalyst to provide polyoxypropylene oxide having a number average molecular weight of 7,000 (calculated in the same way as in Synthesis Example 1). To this hydroxy-terminated polyoxypropylene oxide was then added a methanol solution of NaOMe in an amount of 1.2 equivalents relative to the hydroxy groups of the hydroxy-terminated polyoxypropylene oxide, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 36 ppm of a platinum-divinyldisiloxane complex (isopropanol solution having a platinum content of 3% by weight), and then gradually added dropwise 1.72 parts by weight of dimethoxymethylsilane with stirring. The mixed solution was reacted at 90° C. for 2 hours to provide a dimethoxymethylsilyl-terminated linear polyoxypropylene polymer (B-6) containing 0.7 reactive silyl groups on average per molecule and having a number average molecular weight of 7,000.

Synthesis Example 18

Propylene oxide was polymerized in the presence of polyoxypropylene diol having a molecular weight of about 2,000 as an initiator and a zinc hexacyanocobaltate glyme complex catalyst to provide polyoxypropylene diol having a number average molecular weight of 14,500 (calculated in the same way as in Synthesis Example 1). To the obtained polyoxypropylene diol was then added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 36 ppm of a platinum-divinyldisiloxane complex (isopropanol solution having a platinum content of 3% by weight), and then gradually added dropwise 1.77 parts by weight of dimethoxymethylsilane with stirring. The mixed solution was reacted at 90° C. for 2 hours to provide a dimethoxymethylsilyl-terminated linear polyoxypropylene polymer (B-7) containing 1.5 reactive silyl groups on average per molecule and having a number average molecular weight of 14,500.

Synthesis Example 19

To polyoxypropylene diol having a number average molecular weight of 4,200 (calculated in the same way as in Synthesis Example 1) was added a methanol solution of NaOMe in an amount of 1.2 equivalents relative to the hydroxy groups of the polyoxypropylene diol, and the methanol was distilled off. 3-Chloro-1-propene was then added to the residue, and thereby the terminal hydroxy group was converted to an allyl group. To 100 parts by weight of the obtained allyl-terminated polyoxypropylene polymer were then added 36 ppm of a platinum-divinyldisiloxane complex (isopropanol solution having a platinum content of 3% by weight), and then gradually added dropwise 3.80 parts by weight of dimethoxymethylsilane with stirring. The mixed solution was reacted at 90° C. for 2 hours to provide a dimethoxymethylsilyl-terminated linear polyoxypropylene polymer (B-8) containing 1.0 reactive silyl groups on average per molecule and having a number average molecular weight of 4,200.

Synthesis Example 20

A four-neck flask equipped with a stirrer was charged with 44.7 parts by weight of isobutanol, and the internal temperature of the flask was raised to 105° C. in a nitrogen atmosphere. To the flask was then added dropwise over 5 hours a mixed solution containing 72.9 parts by weight of methyl methacrylate, 6.5 parts by weight of butyl acrylate, 14.6 parts by weight of stearyl methacrylate, 6.0 parts by weight of 3-methacryloxypropylmethyldimethoxysilane, 7.9 parts by weight of 3-mercaptopropylmethyldimethoxysilane, and 2.7 parts by weight of 2,2'-azobis(2-methylbutyronitrile) dissolved in 24.3 parts by weight of isobutanol. The reaction mixture was then subjected to polymerization at 105° C. for 2 hours to provide an isobutanol solution (solid content: 60%) of a reactive silyl group-containing (meth)acrylic polymer (C-1) containing 1.6 silyl groups on average per molecule and having a number average molecular weight of 2,000 (calculated in the same way as in Synthesis Example 1).

Synthesis Example 21

A four-neck flask equipped with a stirrer was charged with 45.5 parts by weight of isobutanol, and the internal temperature of the flask was raised to 105° C. in a nitrogen atmosphere. To the flask was then added dropwise over 5 hours a mixed solution containing 72.5 parts by weight of methyl methacrylate, 6.5 parts by weight of butyl acrylate, 14.6 parts by weight of stearyl methacrylate, 6.4 parts by weight of 3-methacryloxypropyltrimethoxysilane, 8.6 parts by weight of 3-mercaptopropyltrimethoxysilane, and 2.7 parts by weight of 2,2'-azobis(2-methylbutyronitrile) dissolved in 24.3 parts by weight of isobutanol. The reaction mixture was then subjected to polymerization at 105° C. for 2 hours to provide an isobutanol solution (solid content: 60%) of a reactive silyl group-containing (meth)acrylic polymer (C-2) containing 1.6 silyl groups on average per molecule and having a number average molecular weight of 2,000 (calculated in the same way as in Synthesis Example 1).

Synthesis Example 22

A four-neck flask equipped with a stirrer was charged with 45.4 parts by weight of isobutanol, and the internal temperature of the flask was raised to 105° C. in a nitrogen atmosphere. To the flask was then added dropwise over 5 hours a mixed solution containing 59.5 parts by weight of methyl methacrylate, 6.5 parts by weight of butyl acrylate, 14.6 parts by weight of stearyl methacrylate, 19.4 parts by weight of methacryloxymethyltrimethoxysilane, 8.9 parts by weight of n-dodecylmercaptan, and 2.7 parts by weight of 2,2'-azobis (2-methylbutyronitrile) dissolved in 24.3 parts by weight of isobutanol. The reaction mixture was then subjected to polymerization at 105° C. for 2 hours to provide an isobutanol solution (solid content: 60%) of a reactive silyl group-containing (meth)acrylic polymer (C-3) containing 2.0 silyl groups on average per molecule and having a number average molecular weight of 2,000 (calculated in the same way as in Synthesis Example 1).

Synthesis Example 23

To a deoxygenated reactor were added 0.72 parts by weight of cuprous bromide, 13.4 parts by weight of butyl acrylate, 5.0 parts by weight of ethyl acrylate, and 1.6 parts by weight of stearyl acrylate, and the mixture was heated with stirring. Then 8.8 parts by weight of acetonitrile as a polymerization solvent and 1.50 parts by weight of diethyl 2,5-dibromoadipate as an initiator were added to the mixture and mixed therewith. When the temperature of the mixed solution was adjusted to about 80° C., polymerization reaction was started by the addition of pentamethyldiethylenetriamine (hereinafter abbreviated to triamine). The polymerization reaction was then promoted by the addition of 53.6 parts by weight of butyl acrylate, 20 parts by weight of ethyl acrylate, and 6.4 parts by weight of stearyl acrylate in order. During the polymerization, triamine was appropriately added to adjust the polymerization rate. The total amount of triamine used in this polymerization was 0.15 parts by weight. When the monomer conversation rate (polymerization reaction rate) reached about 95% or more, the volatile matter was removed by evaporation under reduced pressure to provide a polymer concentrate.

To the concentrate were then added 21 parts by weight of 1,7-octadiene and 35 parts by weight of acetonitrile and was further added 0.34 parts by weight of triamine. While the internal temperature was adjusted to about 80° C. to about 90° C., the mixture was stirred under heating for some hours to react the polymer end with the octadiene. The acetonitrile and unreacted octadiene were removed by evaporation under reduced pressure to provide a concentrate containing an alkenyl-terminated polymer.

The concentrate was diluted with toluene. A filter aid, an adsorbent (Kyowaad 700SEN; product of Kyowa Chemical Industry Co., Ltd.), and hydrotalcite (Kyowaad 500SH; product of Kyowa Chemical Industry Co., Ltd.) were added thereto, and the mixture was heated to about 80 to 100° C. and stirred. Then, solid components were filtered off. The filtrate was concentrated under reduced pressure to provide a crude polymer.

The crude polymer, a thermal stabilizer (SUMILIZER GS; product of Sumitomo Chemical Co., Ltd.), and adsorbents (Kyowaad 700SEN and Kyowaad 500SH) were mixed. The mixture was evaporated under reduced pressure while being stirred under heating. The temperature was raised by heating, and the mixture was stirred under heating at a temperature of as high as about 170° C. to about 200° C. for several hours while being evaporated under reduced pressure. The reaction mixture was diluted with butyl acetate, and the adsorbents were filtered off. The filtrate was then concentrated to obtain a polymer containing alkenyl groups at both terminals.

To 100 parts by weight of the polymer thus obtained were then added 300 ppm of a platinum-divinyldisiloxane complex (isopropanol solution having a platinum content of 3% by weight) and 0.9 parts by weight of trimethyl orthoformate and then gradually added dropwise 1.7 parts by weight of dimethoxymethylsilane with stirring. The mixed solution was reacted at 100° C. for 1 hour, and unreacted dimethoxymethylsilane was then distilled off under reduced pressure to provide a dimethoxymethylsilyl-terminated linear acrylic ester polymer (C-4) containing 1.9 reactive silyl groups on average per molecule and having a number average molecular weight of 24,000.

Synthesis Example 24

To 40 parts by weight of toluene heated to 105° C. was added dropwise over 5 hours a solution prepared by dissolving in 15 parts by weight of toluene 67 parts by weight of methyl methacrylate, 5 parts by weight of butyl acrylate, 15 parts by weight of stearyl methacrylate, 5 parts by weight of 3-methacryloxypropylmethyldimethoxysilane, 8 parts by weight of γ-mercaptopropylmethyldimethoxysilane, and 3 parts by weight of 2,2'-azobisisobutyronitrile as a polymerization initiator, and the mixture was then stirred for 2 hours. A solution containing 0.3 parts by weight of 2,2'-azobisisobutyronitrile dissolved in 10 parts by weight of toluene was further added thereto, and the mixture was stirred for 2 hours to provide a toluene solution (solid content: 60%) of a reactive silyl group-containing (meth)acrylic polymer (C-5) having 2.0 silyl groups on average per molecule and having a number average molecular weight of 3,000 (calculated in the same way as in Synthesis Example 1).

Synthesis Example 25

To 40 parts by weight of toluene heated to 105° C. was added dropwise over 5 hours a solution prepared by dissolving in 15 parts by weight of toluene 66 parts by weight of methyl methacrylate, 5 parts by weight of butyl acrylate, 15 parts by weight of stearyl methacrylate, 5 parts by weight of 3-methacryloxypropyltrimethoxysilane, 9 parts by weight of γ-mercaptopropyltrimethoxysilane, and 3 parts by weight of 2,2'-azobisisobutyronitrile as a polymerization initiator, and the mixture was then stirred for 2 hours. A solution containing 0.3 parts by weight of 2,2'-azobisisobutyronitrile dissolved in 10 parts by weight of toluene was further added thereto, and the mixture was stirred for 2 hours to provide a toluene solution (solid content: 60%) of a reactive silyl group-containing (meth)acrylic polymer (C-6) having 2.0 silyl groups on average per molecule and having a number average molecular weight of 3,000 (calculated in the same way as in Synthesis Example 1).

Synthesis Example 26

To 40 parts by weight of toluene heated to 105° C. was added dropwise over 5 hours a solution prepared by dissolving in 15 parts by weight of toluene 66 parts by weight of methyl methacrylate, 10 parts by weight of butyl acrylate, 15 parts by weight of stearyl methacrylate, 9 parts by weight of n-dodecyl mercaptan, and 3 parts by weight of 2,2'-azobisisobutyronitrile as a polymerization initiator, and the mixture was then stirred for 2 hours. A solution containing 0.3 parts by weight of 2,2'-azobisisobutyronitrile dissolved in 10 parts by weight of toluene was further added thereto, and the mixture was stirred for 2 hours to provide a toluene solution (solid content: 60%) of a (meth)acrylic polymer (C'-7) having a number average molecular weight of 3,000 (calculated in the same way as in Synthesis Example 1).

Example 1

With 100 parts by weight in total of the polymer (A-1) (70 parts by weight) and the polymer (B-1) (30 parts by weight) were mixed 50 parts by weight of fatty acid-treated calcium carbonate (product name: Hakuenka CCR, product of Shiraishi Kogyo Kaisha, Ltd.) and 50 parts by weight of heavy calcium carbonate (product name: Whiton SB Red, a product of Shiraishi Calcium Kaisha, Ltd.). The mixture was sufficiently kneaded and then dispersed by passing through triple paint rolls three times. Thereafter, the mixture was dehydrated under reduced pressure at 120° C. for 2 hours and cooled to 50° C. or lower. To the mixture were then added 4 parts by weight of vinyltrimethoxysilane (product name: A-171, a product of Momentive Performance Materials Inc.) as a dehydrating agent, 3 parts by weight of γ-aminopropyltrimethoxysilane (product name: A-1110, a product of Momentive Performance Materials Inc.) as an adhesion-imparting agent, and 0.3 parts by weight of DBU (1,8-diazabicyclo[5,4,0]undecene-7, product of Wako Pure Chemical Industries, Ltd.) as a condensation catalyst, and the mixture was kneaded under dehydrated conditions with substantially no water. Thereafter, the mixture was charged into a moisture-proof container (cartridge) and then hermetically packed therein to provide a one-pack curable composition.

(Evaluation)

The skin formation time and tensile properties of the prepared composition were determined by the following methods.

(Skin Formation Time)

In an atmosphere of 23° C. and 50% RH, each curable composition was squeezed out of the cartridge and charged into a mold having a thickness of about 5 mm with a spatula, and the time point at which the surface of the charged composition was flattened was defined as the start time of curing. The curing time was measured by touching the surface of the composition by a spatula from time to time, and determining the time period required for the mixture to no longer stick to the spatula (regarded as skin formation time). Table 1 shows the results.

(Tensile Properties)

In an atmosphere of 23° C. and 50% RH, each curable composition was squeezed out of the cartridge, and the mixture was charged into a polyethylene mold having a thickness of 3 mm so that no air bubble was trapped. The charged composition was cured at 23° C. and 50% RH for 3 days and then at 50° C. for 4 days to give a cured product. No. 3 dumbbell-shaped specimens were punched out from the obtained cured product according to JIS K6251 and subjected to a tensile test (tensile rate: 200 mm/min., 23° C., 50% RH) to determine the tensile strength at break (TB) and the elongation at break (EB). Table 1 shows the results.

Examples 2 to 12 and 16 and Comparative Examples 1 to 12

Each curable composition was prepared in the same way as in Example 1 except that the polymers (A), (B), and (C), plasticizer, filler, thixotropy-imparting agent, ultraviolet absorber, light stabilizer, dehydrating agent, adhesion-imparting agent, and catalyst were mixed at the ratios of Examples 2 to 12 and 16 and Comparative Examples 1 to 12 shown in Tables 1 to 3. The prepared compositions were evaluated. Tables 1 and 3 show their respective results.

Example 13

A polymer mixture having a polymer weight ratio of (A-1)/(C-1)=60/40 was prepared by mixing 60 parts by weight of the reactive silyl group-containing polyoxypropylene polymer (A-1) obtained in Synthesis Example 1 with 66.7 parts by weight of the isobutanol solution of the reactive silyl group-containing (meth)acrylic polymer (C-1) obtained in Synthesis Example 20, and distilling off the isobutanol under reduced pressure. To 100 parts by weight of this polymer mixture were added 50 parts by weight of fatty acid-treated calcium carbonate (product name: Hakuenka CCR, product of Shiraishi Kogyo Kaisha, Ltd.) and 50 parts by weight of heavy calcium carbonate (product name: Whiton SB Red, a product of Shiraishi Calcium Kaisha, Ltd.). The mixture was sufficiently kneaded and then dispersed by passing through triple paint rolls three times. Thereafter, the mixture was dehydrated under reduced pressure at 120° C. for 2 hours and cooled to 50° C. or lower. To the mixture were then added 4 parts by weight of vinyltrimethoxysilane (product name: A-171, a product of Momentive Performance Materials Inc.) as a dehydrating agent, 3 parts by weight of γ-aminopropyltrimethoxysilane (product name: A-1110, a product of Momentive Performance Materials Inc.) as an adhesion-imparting agent, and 0.3 parts by weight of DBU (1,8-diazabicyclo[5,4,0]undecene-7, product of Wako Pure Chemical Industries, Ltd.) as a condensation catalyst, and the mixture was kneaded under dehydrated conditions with substantially no water. Thereafter, the mixture was charged into a moisture-proof container (cartridge) and then hermetically packed therein to provide a one-pack curable composition. Evaluation was performed in the same way as in Example 1.

Examples 14 to 15 and Comparative Examples 13 to 14

Each curable composition was prepared in the same way as in Example 13 except that the polymers (A), (B), and (C), plasticizer, filler, thixotropy-imparting agent, ultraviolet absorber, light stabilizer, dehydrating agent, adhesion-imparting agent, and catalyst were mixed at the ratios of Examples 14 to 15 and Comparative Examples 13 to 14 shown in Tables 2 and 3. The prepared compositions were evaluated. Tables 2 and 3 show their respective results.

TABLE 1

| | | Composition (parts by weight) | | | | | | | | | |
|---|---|---|---|---|---|---|---|---|---|---|---|
| | | Molecular weight | Backbone structure | Silyl group structure [1] | Example 1 | Example 2 | Example 3 | Example 4 | Example 5 | Example 6 | Comparative Example 1 |
| Polyether polymer (A) | (A-1) | 21,100 | Linear | CMDMS | 70 | 50 | 30 | 30 | | | 100 |
| | (A-2) | 28,500 | Linear | CMDMS | | | | | | | |
| | (A-3) | 26,200 | Branched | CMDMS | | | | | 50 | | |
| | (A-4) | 14,600 | Linear | CMDMS | | | | | | | |
| | (A-5) | 14,600 | Linear | MMDMS | | | | | | | |
| | (A-6) | 14,600 | Linear | α-type DMS | | | | | | 50 | |
| | (A-7) | 28,500 | Linear | CMDMS | | | | | | | |
| | (A-8) | 7,000 | Linear | CMDMS | | | | | | | |
| Polyether polymer (B) | (B-1) | 21,100 | Linear | DMS | 30 | 50 | | | 50 | | |
| | (B-2) | 28,500 | Linear | DMS | | | | | | | |
| | (B-3) | 26,200 | Branched | DMS | | | 70 | | | 50 | |
| | (B-4) | 28,500 | Linear | DMS | | | | | | | |
| | (B-5) | 28,500 | Linear | TMS | | | | 70 | | | |
| | (B-6) | 7,000 | Linear | DMS | | | | | | | |
| Filler | Hakuenka CCR [2] | | | | 50 | 50 | 50 | 50 | 50 | 50 | 50 |
| | Whiton SB Red [3] | | | | 50 | 50 | 50 | 50 | 50 | 50 | 50 |
| Plasticizer | DIDP [4] | | | | | | | | | | |
| | Hexamoll DINCH [5] | | | | | | | | | | |
| Thixotropy-imparting agent | DISPARLON #6500 [6] | | | | | | | | | | |
| Ultraviolet absorber | SUMISORB 400 [7] | | | | | | | | | | |
| Light stabilizer | SANOL LS-770 [8] | | | | | | | | | | |
| Dehydrating agent | A-171 [9] | | | | 4 | 4 | 4 | 4 | 4 | 4 | 4 |
| Adhesion-imparting agent | A-1110 [10] | | | | 3 | 3 | 3 | 3 | 3 | 3 | 3 |
| Catalyst | DBU [11] | | | | 0.3 | | 0.3 | 0.3 | 0.3 | | 0.3 |
| | 1-Phenylguanidine | | | | | | | | | | |
| | NEOSTANN S-1 [12] | | | | | 0.2 | | | | | |
| | TIB223 [13] | | | | | | | | | | |
| | U-220H [14] | | | | | | | | | | |
| Curability | Skin formation time (minutes) | | | | 20 | 20 | 35 | 35 | 15 | 20 | 15 |
| Tensile test (No. 3 dumbbell) | TB (MPa) | | | | 1.6 | 1.8 | 2.0 | 1.7 | 2.0 | 2.2 | 1.4 |
| | EB (%) | | | | 280 | 260 | 250 | 280 | 220 | 170 | 190 |

| | | Composition (parts by weight) | | | | | | | |
|---|---|---|---|---|---|---|---|---|---|
| | | Molecular weight | Backbone structure | Silyl group structure [1] | Comparative Example 2 | Comparative Example 3 | Comparative Example 4 | Comparative Example 5 | Comparative Example 6 |
| Polyether polymer (A) | (A-1) | 21,100 | Linear | CMDMS | | | | | |
| | (A-2) | 28,500 | Linear | CMDMS | | | | | |
| | (A-3) | 26,200 | Branched | CMDMS | 100 | | | | |

TABLE 1-continued

| | | | | | | | | | | |
|---|---|---|---|---|---|---|---|---|---|---|
| | | (A-4) | 14,600 | Linear | CMDMS | | | | | |
| | | (A-5) | 14,600 | Linear | MMMDS | | | | | |
| | | (A-6) | 14,600 | Linear | α-type DMS | | 100 | | | |
| | | (A-7) | 28,500 | Linear | CMDMS | | | | | |
| | | (A-8) | 7,000 | Linear | CMDMS | | | | | |
| Polyether | (B-1) | 21,100 | Linear | DMS | | | 100 | | | |
| polymer (B) | (B-2) | 28,500 | Linear | DMS | | | | | | |
| | (B-3) | 26,200 | Branched | DMS | | | | | 100 | |
| | (B-4) | 28,500 | Linear | DMS | | | | | | |
| | (B-5) | 28,500 | Linear | TMS | | | | | | 100 |
| | (B-6) | 7,000 | Linear | DMS | | | | | | |
| Filler | Hakuenka CCR [2] | | | | 50 | 50 | 50 | 50 | 50 | |
| | Whiton SB Red [3] | | | | 50 | 50 | 50 | 50 | 50 | |
| Plasticizer | DIDP [4] | | | | | | | | | |
| | Hexamoll DINCH [5] | | | | | | | | | |
| Thixotropy-imparting agent | DISPARLON #6500 [6] | | | | | | | | | |
| Ultraviolet absorber | SUMISORB 400 [7] | | | | | | | | | |
| Light stabilizer | SANOL LS-770 [8] | | | | | | | | | |
| Dehydrating agent | A-171 [9] | | | | 4 | 4 | 4 | 4 | 4 | |
| Adhesion-imparting agent | A-1110 [10] | | | | 3 | 3 | 3 | 3 | 3 | |
| Catalyst | DBU [11] | | | | 0.3 | | 0.3 | 0.3 | 0.3 | |
| | 1-Phenylguanidine | | | | | | | | | |
| | NEOSTANN S-1 [12] | | | | | | | | | |
| | TIB223 [13] | | | | | | | | | |
| | U-220H [14] | | | | | | | | | |
| Curability | Skin formation time (minutes) | | | | 10 | 10 | 250 | 150 | 200 | |
| Tensile test (No. 3 dumbbell) | TB (MPa) | | | | 1.8 | 2.2 | 1.7 | 2.0 | 1.5 | |
| | EB (%) | | | | 110 | 110 | 470 | 200 | 250 | |

[1] CMDMS: chloromethyldimethoxysilyl group, MMMDS: methoxymethyldimethoxysilyl group, DMS: dimethoxymethylsilyl group, TMS: trimethoxysilyl group
[2] Fatty acid-treated precipitated calcium carbonate (Shiraishi Kogyo Kaisha, Ltd.)
[3] Heavy calcium carbonate (SHIRAISHI CALCIUM KAISHA, LTD.)
[4] Diisodecyl phthalate (J-PLUS Co., Ltd.)
[5] 1,2-Cyclohexanedicarboxylic acid diisononyl ester (BASF)
[6] Fatty acid amide wax (Kusumoto Chemicals, Ltd.)
[7] 2,4-Di-tert-butylphenyl-3,5-di-tert-butyl-4-hydroxybenzoate (Sumitomo Chemical Company, Limited)
[8] Bis(2,2,6,6-tetramethyl-4-piperidyl)sebacate (Sankyo Lifetech Co., Ltd.)
[9] Vinyltrimethoxysilane (Momentive)
[10] 3-Aminopropyltrimethoxysilane (Momentive)
[11] 1,8-Diazabicyclo[5.4.0]undecene-7 (Wako Pure Chemical Industries, Ltd.)
[12] Dioctyltin(bistriethoxysilicate) (Nitto Kasei Co., Ltd.)
[13] Dioctyltin diacetylacetonate (TIB Chemicals AG)
[14] Dibutyltin diacetylacetonate (Nitto Kasei Co., Ltd.)

TABLE 2

| | | | Composition (parts by weight) | | | | | | | | | |
|---|---|---|---|---|---|---|---|---|---|---|---|---|
| | | Molecular weight | Backbone structure | Silyl group structure [1] | Example 7 | Example 8 | Example 9 | Example 10 | Example 11 | Example 12 | Comparative Example 7 |
| Polyether polymer (A) | (A-1) | 21,100 | Linear | CMDMS | | | | | | | |
| | (A-2) | 28,500 | Linear | CMDMS | 70 | | | | | | 100 |
| | (A-3) | 26,200 | Branched | CMDMS | | | | | | | |
| | (A-4) | 14,600 | Linear | CMDMS | | 50 | | | | 50 | |
| | (A-5) | 14,600 | Linear | MMMDS | | | 50 | | | | |
| | (A-6) | 14,600 | Linear | α-type DMS | | | | | | 50 | |
| | (A-7) | 28,500 | Linear | CMDMS | | | | 50 | | | |
| | (A-8) | 7,000 | Linear | CMDMS | | | | | 30 | | |
| Polyether polymer (B) | (B-1) | 21,100 | Linear | DMS | | | | | 50 | | |
| | (B-2) | 28,500 | Linear | DMS | | | 50 | | 70 | | |
| | (B-3) | 26,200 | Branched | DMS | | | | | | | |
| | (B-4) | 28,500 | Linear | DMS | | 50 | | | | | |
| | (B-5) | 28,500 | Linear | TMS | | | | | | | |
| | (B-6) | 7,000 | Linear | DMS | 30 | | | | | | |
| Filler | Hakuenka CCR [2] | | | | 50 | 50 | 50 | 50 | 50 | 50 | 50 |
| | Whiton SB Red [3] | | | | 160 | 160 | 160 | 160 | 160 | 160 | 160 |
| Plasticizer | DIDP [4] | | | | | | | | | | |
| | Hexamoll DINCH [5] | | | | 30 | 30 | 30 | 30 | 30 | 30 | 30 |
| Thixotropy-imparting agent | DISPARLON #6500 [6] | | | | 3 | 3 | 3 | 3 | 3 | 3 | 3 |

TABLE 2-continued

| | | | | | | | | |
|---|---|---|---|---|---|---|---|---|
| Ultraviolet absorber | SUMISORB 400 [7] | 1 | 1 | 1 | 1 | 1 | 1 | 1 |
| Light stabilizer | SANOL LS-770 [8] | 1 | 1 | 1 | 1 | 1 | 1 | 1 |
| Dehydrating agent | A-171 [9] | 4 | 4 | 4 | 4 | 4 | 4 | 4 |
| Adhesion-imparting agent | A-1110 [10] | 3 | 3 | 3 | 3 | 3 | 3 | 3 |
| Catalyst | DBU [11] | | | | | | | |
| | 1-Phenylguanidine | 0.3 | 0.3 | | 0.3 | | 0.3 | 0.3 |
| | NEOSTANN S-1 [12] | | | | | | | |
| | TIB223 [13] | | | 0.3 | | | | |
| | U-220H [14] | | | | | 1 | | |
| Curability | Skin formation time (minutes) | 15 | 20 | 50 | 50 | 30 | 10 | 15 |
| Tensile test (No. 3 dumbbell) | TB (MPa) | 1.5 | 2.0 | 1.5 | 1.8 | 1.3 | 2 | 1.5 |
| | EB (%) | 350 | 200 | 250 | 220 | 380 | 150 | 200 |

| | | Composition (parts by weight) | | | | | | | |
|---|---|---|---|---|---|---|---|---|---|
| | | Molecular weight | Backbone structure | Silyl group structure [1] | Comparative Example 8 | Comparative Example 9 | Comparative Example 10 | Comparative Example 11 | Comparative Example 12 |
| Polyether polymer (A) | (A-1) | 21,100 | Linear | CMDMS | | | | | |
| | (A-2) | 28,500 | Linear | CMDMS | | | | | |
| | (A-3) | 26,200 | Branched | CMDMS | | | | | |
| | (A-4) | 14,600 | Linear | CMDMS | 100 | | | | |
| | (A-5) | 14,600 | Linear | MMDMS | | 100 | | | |
| | (A-6) | 14,600 | Linear | α-type DMS | | | | | |
| | (A-7) | 28,500 | Linear | CMDMS | | | 100 | | |
| | (A-8) | 7,000 | Linear | CMDMS | | | | | |
| Polyether polymer (B) | (B-1) | 21,100 | Linear | DMS | | | | | |
| | (B-2) | 28,500 | Linear | DMS | | | | 100 | |
| | (B-3) | 26,200 | Branched | DMS | | | | | |
| | (B-4) | 28,500 | Linear | DMS | | | | | 100 |
| | (B-5) | 28,500 | Linear | TMS | | | | | |
| | (B-6) | 7,000 | Linear | DMS | | | | | |
| Filler | Hakuenka CCR [2] | | | | 50 | 50 | 50 | 50 | 50 |
| | Whiton SB Red [3] | | | | 160 | 160 | 160 | 160 | 160 |
| Plasticizer | DIDP [4] | | | | | | | | |
| | Hexamoll DINCH [5] | | | | 30 | 30 | 30 | 30 | 30 |
| Thixotropy-imparting agent | DISPARLON #6500 [6] | | | | 3 | 3 | 3 | 3 | 3 |
| Ultraviolet absorber | SUMISORB 400 [7] | | | | 1 | 1 | 1 | 1 | 1 |
| Light stabilizer | SANOL LS-770 [8] | | | | 1 | 1 | 1 | 1 | 1 |
| Dehydrating agent | A-171 [9] | | | | 4 | 4 | 4 | 4 | 4 |
| Adhesion-imparting agent | A-1110 [10] | | | | 3 | 3 | 3 | 3 | 3 |
| Catalyst | DBU [11] | | | | | | | | |
| | 1-Phenylguanidine | | | | 0.3 | | 0.3 | | 0.3 |
| | NEOSTANN S-1 [12] | | | | | | | | |
| | TIB223 [13] | | | | | 0.3 | | | |
| | U-220H [14] | | | | | | | 1 | |
| Curability | Skin formation time (minutes) | | | | 20 | 30 | 20 | 50 | 150 |
| Tensile test (No. 3 dumbbell) | TB (MPa) | | | | 1.5 | 1.3 | 1.8 | 1.7 | 1.4 |
| | EB (%) | | | | 110 | 200 | 250 | 350 | 110 |

[1] CMDMS: chloromethyldimethoxysilyl group, MMDMS: methoxymethyldimethoxysilyl group, DMS: dimethoxymethylsilyl group, TMS: trimethoxysilyl group
[2] Fatty acid-treated precipitated calcium carbonate (Shiraishi Kogyo Kaisha, Ltd.)
[3] Heavy calcium carbonate (SHIRAISHI CALCIUM KAISHA, LTD.)
[4] Diisodecyl phthalate (J-PLUS Co., Ltd.)
[5] 1,2-Cyclohexanedicarboxylic acid diisonyl ester (BASF)
[6] Fatty acid amide wax (Kusumoto Chemicals, Ltd.)
[7] 2,4-Di-tert-butylphenyl-3,5-di-tert-butyl-4-hydroxybenzoate (Sumitomo Chemical Company, Limited)
[8] Bis(2,2,6,6-tetramethyl-4-piperidyl)sebacate (Sankyo Lifetech Co., Ltd.)
[9] Vinyltrimethoxysilane (Momentive)
[10] 3-Aminopropyltrimethoxysilane (Momentive)
[11] 1,8-Diazabicyclo[5.4.0]undecene-7 (Wako Pure Chemical Industries, Ltd.)
[12] Dioctyltin(bistriethoxysilicate) (Nitto Kasei Co., Ltd.)
[13] Dioctyltin diacetylacetonate (TIB Chemicals AG)
[14] Dibutyltin diacetylacetonate (Nitto Kasei Co., Ltd.)

TABLE 3

| Composition (parts by weight) | | Molecular weight | Backbone structure | Silyl group structure [1] | Example 13 | Example 14 | Example 15 | Example 16 | Comparative Example 13 | Comparative Example 14 |
|---|---|---|---|---|---|---|---|---|---|---|
| Polyether polymer (A) | (A-1) | 21,100 | Linear | CMDMS | 60 | 60 | | | | |
| | (A-2) | 28,500 | Linear | CMDMS | | | | | | |
| | (A-3) | 26,200 | Branched | CMDMS | | | 60 | | | |
| | (A-4) | 14,600 | Linear | CMDMS | | | | 50 | | |
| | (A-5) | 14,600 | Linear | MMDMS | | | | | | |
| | (A-6) | 14,600 | Linear | α-type DMS | | | | | | |
| | (A-7) | 28,500 | Linear | CMDMS | | | | | | |
| | (A-8) | 7,000 | Linear | CMDMS | | | | | | |
| Polyether polymer (B) | (B-1) | 21,100 | Linear | DMS | | | | | 60 | 60 |
| | (B-2) | 28,500 | Linear | DMS | | | | | | |
| | (B-3) | 26,200 | Branched | DMS | | | | | | |
| | (B-4) | 28,500 | Linear | DMS | | | | | | |
| | (B-5) | 28,500 | Linear | TMS | | | | | | |
| | (B-6) | 7,000 | Linear | DMS | | | | | | |
| Acrylic polymer (C) | (C-1) | 2,000 | Linear | DMS | 40 | | | | 40 | |
| | (C-2) | 2,000 | Linear | TMS | | 40 | | | | 40 |
| | (C-3) | 2,000 | Linear | α-type TMS | | | 40 | | | |
| | (C-4) | 27,000 | Linear | DMS | | | | 50 | | |
| Filler | Hakuenka CCR [2] | | | | 50 | 50 | 50 | 50 | 50 | 50 |
| | Whiton SB Red [3] | | | | 50 | 50 | 160 | 160 | 50 | 50 |
| Plasticizer | DIDP [4] | | | | 20 | 20 | | | 20 | 20 |
| | Hexamoll DINCH [5] | | | | | | 30 | 30 | | |
| Thixotropy-imparting agent | DISPARLON #6500 [6] | | | | | | 3 | 3 | | |
| Ultraviolet absorber | SUMISORB 400 [7] | | | | | | 1 | 1 | | |
| Light stabilizer | SANOL LS-770 [8] | | | | | | 1 | 1 | | |
| Dehydrating agent | A-171 [9] | | | | 4 | 4 | 4 | 4 | 4 | 4 |
| Adhesion-imparting agent | A-1110 [10] | | | | 3 | 3 | 3 | 3 | 3 | 3 |
| Catalyst | DBU [11] | | | | 0.3 | | | | 0.3 | 0.3 |
| | 1-Phenylguanidine | | | | | | 1 | 0.3 | | |
| | NEOSTANN S-1 [12] | | | | | 0.2 | | | | |
| | TIB223 [13] | | | | | | | | | |
| | U-220H [14] | | | | | | | | | |
| Curability | Skin formation time (minutes) | | | | 15 | 35 | 3 | 20 | 270 | 60 |
| Tensile test | TB (MPa) | | | | 2.0 | 2.3 | 2.0 | 1.7 | 2.0 | 2.3 |
| (No. 3 dumbbell) | EB (%) | | | | 360 | 200 | 150 | 150 | 390 | 200 |

[1] CMDMS: chloromethyldimethoxysilyl group, MMDMS: methoxymethyldimethoxysilyl group, DMS: dimethoxymethylsilyl group, TMS: trimethoxysilyl group
[2] Fatty acid-treated precipitated calcium carbonate (Shiraishi Kogyo Kaisha, Ltd.)
[3] Heavy calcium carbonate (SHIRAISHI CALCIUM KAISHA, LTD.)
[4] Diisodecyl phthalate (J-PLUS Co., Ltd.)
[5] 1,2-Cyclohexanedicarboxylic acid diisononyl ester (BASF)
[6] Fatty acid amide wax (Kusumoto Chemicals, Ltd.)
[7] 2,4-Di-tert-butylphenyl-3,5-di-tert-butyl-4-hydroxybenzoate (Sumitomo Chemical Company, Limited)
[8] Bis(2,2,6,6-tetramethyl-4-piperidyl)sebacate (Sankyo Lifetech Co., Ltd.)
[9] Vinyltrimethoxysilane (Momentive)
[10] 3-Aminopropyltrimethoxysilane (Momentive)
[11] 1,8-Diazabicyclo[5.4.0]undecene-7 (Wako Pure Chemical Industries, Ltd.)
[12] Dioctyltin(bistriethoxysilicate) (Nitto Kasei Co., Ltd.)
[13] Dioctyltin diacetylacetonate (TIB Chemicals AG)
[14] Dibutyltin diacetylacetonate (Nitto Kasei Co., Ltd.)

Comparing the results of Examples and Comparative Examples in Tables 1 to 3, it is found that the mixture of the polymer (A) containing a reactive silyl group having a specific structure with the dimethoxymethylsilyl- or trimethoxysilyl-terminated polymer (B) and/or the acrylic polymer (C) exhibits favorable skin formation time and excellent tensile properties of the cured product even when an amine catalyst or a small amount of a dioctyltin compound was used. As demonstrated, however, the polymer (A) alone offers insufficient elongation of the cured product, while the polymer (B) alone slows the skin formation time.

Example 17

With 100 parts by weight in total of the polymer (A-2) (20 parts by weight) and the polymer (B-7) (80 parts by weight) were mixed 100 parts by weight of heavy calcium carbonate (product name: Whiton SB Red, a product of Shiraishi Calcium Kaisha, Ltd.) and 2 parts by weight of hydrophilic fumed silica (product name: Aerosil 200, a product of Nippon Aerosil Co., Ltd.). The mixture was sufficiently kneaded and then dispersed by passing through triple paint rolls once. Subsequently, the mixture was kneaded for 2 hours while dehydrated under reduced pressure conditions of 0.2 mmHg at 120° C. using a planetary mixer. After cooling to room temperature, 2 parts by weight of vinyltrimethoxysilane as a dehydrating agent, 2 parts by weight of γ-aminopropyltrimethoxysilane as an adhesion-imparting agent, 5 parts by weight of 1-o-tolylbiguanide as a condensation catalyst, and 0.3 parts by weight of dibutyltin dilaurate (product name: NEOSTANN U-100, produced by Nitto Kasei Co., Ltd.) were added to the mixture and the mixture was kneaded under dehydrated conditions with substantially no water. Thereafter, the mixture was charged into a moisture-proof container (cartridge) and then hermetically packed therein to provide a one-pack curable composition.

(Evaluation)

The initial tack properties and adhesion of the prepared compositions were determined by the following methods.

(Initial Tack)

Tack Development Time and Tack Time

Each prepared composition was applied to a slate plate by combing. Thereafter, the state of the applied composition was observed by a finger touch. The time point at which the finger felt a resistance when it was released from the composition was regarded as the tack development time. The time period during which this resistance continued was regarded as the tack time.

Initial Holding Power (Tack Strength)

Each prepared composition was applied to a slate plate by combing. A vinyl floor sheet (PERMALEUM, a product of Tajima, Inc.) having a length of 200 mm and a width of 25 mm was laminated thereto. The vinyl floor sheet used was in advance wrapped, with its backside facing inward, around a PVC pipe having a radius of 25 mm and thereby deformed. After the lamination of this vinyl floor sheet, the laminate was left for a while. The tack strength was assessed as being poor (x) when the vinyl floor sheet arched up and separated. The tack strength was assessed as being good (○) when the vinyl floor sheet stayed laminated without arching up.

(Adhesion Strength)

Each prepared composition was applied to a slate plate by combing according to JIS A5536, and an open time was taken until tack was developed. Thereafter, a vinyl floor sheet (PERMALEUM, a product of Tajima, Inc.) having a length of 200 mm and a width of 25 mm was laminated thereto. The laminate was left at 23° C. for 1 week and then subjected to a tensile test (tensile rate: 200 mm/min) in a peeling direction at 90° to determine the adhesion strength.

Examples 18 to 23 and Comparative Examples 15 to 20

Each curable composition was prepared in the same way as in Example 18 except that the polymers (A), (B), and (C), filler, dehydrating agent, adhesion-imparting agent, and catalyst were mixed at the ratios of Examples 18 to 23 and Comparative Examples 15 to 20 shown in Tables 4 and 5. The prepared compositions were evaluated. Tables 4 and 5 show their respective results.

TABLE 4

| Composition (parts by weight) | | Molecular weight | Backbone structure | Silyl group structure [1] | Example 17 | Example 18 | Comparative Example 15 | Comparative Example 16 |
|---|---|---|---|---|---|---|---|---|
| Polyether polymer (A) | (A-2) | 28,500 | Linear | CMDMS | 20 | 20 | 100 | 100 |
| Polyether polymer (B) | (B-2) | 28,500 | Linear | DMS | | 50 | | |
| | (B-7) | 14,500 | Linear | DMS | 80 | | | |
| | (B-8) | 4,200 | Linear | DMS | | 30 | | |
| Filler | Aerosil 200 [2] | | | | 2 | 2 | 2 | 2 |
| | Whiton SB Red [3] | | | | 100 | 100 | 100 | 100 |
| Dehydrating agent | A-171 [4] | | | | 2 | 2 | 2 | 2 |
| Adhesion-imparting agent | A-1110 [5] | | | | 2 | 2 | 2 | 2 |
| Catalyst | 1-o-Tolylbiguanide | | | | 5 | 5 | 5 | 5 |
| | NEOSTANN U-100 [6] | | | | 0.3 | 0.3 | 0.3 | 0.3 |
| Viscosity (Pa·S) | | | | | 410 | 190 | 490 | 480 |
| Tack development time (minutes) | | | | | 15 | 15 | 10 | 10 |
| Initial holding power (Tack strength) | | | | | ○ | ○ | ○ | ○ |
| Tack time (minutes) | | | | | 15-110 | 15-100 | 10-20 | 10-20 |
| Peel adhesion strength (N/25 mm) | | | | | 27 | 24 | 20 | 21 |

[1] CMDMS: chloromethyldimethoxysilyl group, DMS: dimethoxymethylsilyl group, TMS: trimethoxysilyl group
[2] Hydrophilic fumed silica (Nippon Aerosil Co., Ltd.)
[3] Heavy calcium carbonate (SHIRAISHI CALCIUM KAISHA, LTD.)
[4] Vinyltrimethoxysilane (Momentive)
[5] N-(β-aminoethyl)-γ-aminopropyltrimethoxysilane (Momentive)
[6] Dibutyltin dilaurate (Nitto Kasei Co., Ltd.)

TABLE 5

| Composition (parts by weight) | | | | | Example 19 | Example 20 | Example 21 | Example 22 | Example 23 | Comparative Example 17 | Comparative Example 18 | Comparative Example 19 | Comparative Example 20 |
|---|---|---|---|---|---|---|---|---|---|---|---|---|---|
| | | Molecular weight | Backbone structure | Silyl group structure [1] | | | | | | | | | |
| Polyether polymer (A) | (A-2) | 28,500 | Linear | CMDMS | 30 | 30 | 30 | 100 | 20 | | | | |
| Polyether polymer (B) | (B-1) | 21,100 | Linear | DMS | 70 | 70 | 70 | 70 | | 70 | 70 | | |
| | (B-5) | 28,500 | Linear | TMS | | | | | | | 30 | 20 | 20 |
| | (B-7) | 14,500 | Linear | DMS | | | | | 80 | | | 80 | 80 |
| Acrylic polymer (C) | (C-5) | 3,000 | Linear | DMS | 30 | | | | 30 | 30 | | 30 | 30 |
| | (C-6) | 3,000 | Linear | TMS | | 30 | | | | | 30 | | |
| | (C'-7) | 3,000 | Linear | — | | | 30 | 30 | | | | | |
| Filler | Aerosil 200 [2] | | | | 2 | 2 | 2 | 2 | 2 | 2 | 2 | 2 | 2 |
| | Whiton SB Red [3] | | | | 100 | 100 | 100 | 100 | 100 | 100 | 100 | 100 | 100 |

TABLE 5-continued

| | | Composition (parts by weight) | | | | | | | Comparative Example 17 | Comparative Example 18 | Comparative Example 19 | Comparative Example 20 |
| | | Molecular weight | Backbone structure | Silyl group structure [1] | Example 19 | Example 20 | Example 21 | Example 22 | Example 23 | | | | |
|---|---|---|---|---|---|---|---|---|---|---|---|---|---|
| Dehydrating agent | A-171 [4] | | | | 2 | 2 | 2 | 2 | 2 | 2 | 2 | 2 | 2 |
| Adhesion-imparting agent | A-1110 [5] | | | | 2 | 2 | 2 | 2 | 2 | 2 | 2 | 2 | 2 |
| Catalyst | 1-o-Tolylbiguanide | | | | 5 | 5 | 5 | 5 | 5 | 5 | 5 | | 5 |
| | NEOSTANN U-100 [6] | | | | 0.3 | 0.3 | 0.3 | 0.3 | 0.3 | 0.3 | 0.3 | 0.3 | 0.3 |
| Tack development time (minutes) | | | | | 15 | 10 | 10 | 5 | 20 | 150 | 50 | 60 | 60 |
| Initial holding power (tack strength) | | | | | ○ | ○ | ○ | ○ | ○ | ○ | ○ | ○ | ○ |
| Tack time (minutes) | | | | | 15-220 | 10-190 | 10-310 | 5-100 | 20-220 | 150-170 | 50-80 | 60-80 | 60-80 |
| Peel adhesion strength (N/25 mm) | | | | | 34 | 32 | 38 | 30 | 35 | 31 | 29 | 24 | 26 |

[1] CMDMS: chloromethyldimethoxysilyl group, DMS: dimethoxymethylsilyl group, TMS: trimethoxysilyl group
[2] Hydrophilic fumed silica (Nippon Aerosil Co., Ltd.)
[3] Heavy calcium carbonate (SHIRAISHI CALCIUM KAISHA, LTD.)
[4] Vinyltrimethoxysilane (Momentive)
[5] N-(β-aminoethyl)-γ-aminopropyltrimethoxysilane (Momentive)
[6] Dibutyltin dilaurate (Nitto Kasei Co., Ltd.)

Comparing the results of Examples and Comparative Examples in Tables 4 and 5, it is found that the mixture of the polymer (A) containing a reactive silyl group having a specific structure and the polymer (B) (and the polymer (C)) develops tack rapidly and keeps it for a very long period of time and is thus excellent as contact adhesive. In addition, the tack strength thus developed is sufficiently high for practical use. On the other hand, compositions containing components other than the combinations of the polymers according to the present invention fail to have tack strength suitable for practical use, or have a tack time shorter than that of the compositions of the present invention.

INDUSTRIAL APPLICABILITY

The curable composition of the present invention comprising the reactive silyl group-containing polyether polymer (A), and the reactive silyl group-containing polyether polymer (B) and/or the reactive silyl group-containing (meth) acrylic polymer has excellent elongation properties and rapid curability and is also excellent in initial tack properties.

The invention claimed is:

1. A curable composition, comprising: a polyether polymer (A) containing a reactive silyl group represented by the following formula (1); and at least one of a polyether polymer (B) containing a reactive silyl group represented by the following formula (2) and a (meth)acrylic polymer (C) containing a reactive silyl group represented by the following formula (3):

$$-W-CH_2-SiR^1_a R^2_b X_c \quad (1)$$

wherein $R^1$ is a methoxymethyl group; $R^2$ represents a C1 to C20 hydrocarbon group, a C6 to C20 aryl group, a C7 to C20 aralkyl group, or a triorganosiloxy group represented by $R^0_3SiO-$ wherein each of three $R^0$s is a C1 to C20 hydrocarbon group and they may be the same as or different from each other; X represents a hydroxy or hydrolyzable group; W represents a linking group selected from $-O-R^8-$, $-O-CO-N(R^9)-$, $-N(R^9)-CO-O-$, $-N(R^9)-CO-N(R^9)-$, $-S-CO-NH-$, $-NH-CO-S-$, wherein $R^8$ represents a divalent C1 to C8 hydrocarbon group, and $R^9$ represents hydrogen or a C1 to C18 hydrocarbon group optionally substituted with halogen; in the case that W is $-O-R^8-$, a is 1 or 2, b is 0 or 1, and c is 1 or 2, provided that a+b+c =3 is satisfied; in the case that W is a group other than $-O-R^8-$, a is 0, 1, or 2, b is 0, 1, or 2, and c is 1, 2, or 3, provided that a+b+c=3 is satisfied; and in the case that a plurality of $R^1$s, $R^2$s, or Xs exist, they may be the same as or different from each other, $$-V-SiR^2_d X_{3-d} \quad (2)$$

wherein $R^2$ and X are defined as mentioned in formula (1); V represents a divalent C2 to C8 hydrocarbon group; d represents any of 0, 1, and 2; and in the case that a plurality of $R^2$s or Xs exist, they may be the same as or different from each other, and $$-Z-(CH_2)_n-SiR^1_a R^2_b X_c \quad (3)$$

wherein $R^1$, $R^2$, and X are defined as mentioned in formula (1); Z represents a linking group selected from $-CO-O-$, $-O-CO-N(R^9)-$, $-N(R^9)-CO-O-$, $-N(R^9)-CO-N(R^9)-$, $-S-CO-NH-$, $-NH-CO-S-$, and $-S-$ wherein $R^9$ is defined as mentioned in formula (1); n represents a number of 1 to 8; a is 0,1, or 2, b is 0, 1, or 2, and c is 1, 2, or 3, provided that the condition: a+b+c =3 is satisfied; and in the case that a plurality of $R^1$s, $R^2$s, or Xs exist, they may be the same as or different from each other.

2. The curable composition according to claim 1, wherein W in formula (1) is $-O-R^8-$ wherein $R^8$ is a divalent C1 to C8 hydrocarbon group.

3. The curable composition according to claim 1, wherein the polyether polymer (A) is a polyoxypropylene polymer.

4. The curable composition according to claim 1, wherein the polyether polymer (A) is a linear polymer having no branch.

5. The curable composition according to claim 1, wherein a backbone structure of the polyether polymer (B) is a polyoxypropylene polymer.

6. The curable composition according to claim 1, wherein the reactive silyl group of formula (2) is a dimethoxymethylsilyl group.

7. The curable composition according to claim 1, wherein the (meth)acrylic polymer (C) is at least one of a reactive silyl group-containing alkyl (meth)acrylate polymer and copolymer.

8. A curable composition, which comprises a polyether polymer (A) containing a reactive silyl group represented by the following formula (1); a polyether polymer (B) containing a reactive silyl group represented by the following formula (2); and a (meth)acrylic polymer (C) containing a reactive silyl group represented by the following formula (3):

$$-W-CH_2-SiR^1{}_aR^2{}_bX_c \qquad (1)$$

wherein $R^1$ is a C1 to C20 hydrocarbon group wherein at least one hydrogen atom on carbon atoms at positions 1 to 3 is replaced with halogen, $-OR^3$, $-NR^4R^5$, $-N=R^6$, $-SR^7$ (in which each of $R^3$, $R^4$, $R^5$, and $R^7$ is a hydrogen atom or a C1 to C20 substituted or unsubstituted hydrocarbon group, and $R^6$ is a divalent C1 to C20 substituted or unsubstituted hydrocarbon group), a C1 to C20 perfluoroalkyl group, or a cyano group; $R^2$ represents a C1 to C20 hydrocarbon group, a C6 to C20 aryl group, a C7 to C20 aralkyl group, or a triorganosiloxy group represented by $R^0{}_3SiO-$ wherein each of three $R^0$s is a C1 to C20 hydrocarbon group and they may be the same as or different from each other; X represents a hydroxy or hydrolyzable group; W represents a linking group selected from $-O-R^8-$, $-O-CO-N(R^9)-$, $-N(R^9)-CO-O-$, $-N(R^9)-CO-N(R^9)-$, $-S-CO-NH-$, $-NH-CO-S-$, and $-S-$ wherein $R^8$ represents a divalent C1 to C8 hydrocarbon group, and $R^9$ represents hydrogen or a C1 to C18 hydrocarbon group optionally substituted with halogen; in the case that W is $-O-R^8-$, a is 1 or 2, b is 0 or 1, and c is 1 or 2, provided that a+b+c =3 is satisfied; in the case that W is a group other than $-O-R^8-$, a is 0, 1, or 2, b is 0, 1, or 2, and c is 1, 2, or 3, provided that a+b+c =3 is satisfied; and in the case that a plurality of $R^1$s, $R^2$s, or Xs exist, they may be the same as or different from each other, $$-V-SiR^2{}_dX_{3-d} \qquad (2)$$

wherein $R^2$ and X are defined as mentioned in formula (1); V represents a divalent C2 to C8 hydrocarbon group; d represents any of 0, 1, and 2; and in the case that a plurality of $R^2$s or Xs exist, they may be the same as or different from each other, and $$-Z-(CH_2)_n-SiR^1{}_aR^2{}_bX_c \qquad (3)$$

wherein $R^1$, $R^2$, and X are defined as mentioned in formula (1); Z represents a linking group selected from $-CO-O-$, $-O-CO-N(R^9)-$, $-N(R^9)-CO-O-$, $-N(R^9)-CO-N(R^9)-$, $-S-CO-NH-$, $-NH-CO-S-$, and $-S-$ wherein $R^9$ is defined as mentioned in formula (1); n represents a number of 1 to 8; a is 0, 1, or 2, b is 0, 1, or 2, and c is 1, 2, or 3, provided that the condition: a+b+c =3 is satisfied; and in the case that a plurality of $R^1$s, $R^2$s, or Xs exist, they may be the same as or different from each other.

9. The curable composition according to claim 8, wherein the polyether polymer (A) has a number average molecular weight of 22,000 or higher.

10. The curable composition according to claim 8, wherein the polyether polymer (A) and the polyether polymer (B) are contained at a ratio of (A):(B)=50:50 to 5:95 (parts by weight).

11. The curable composition according to claim 8, further comprising: at least one of an amine compound (d1) and an organic dialkyltin compound (d2) as a condensation catalyst (D).

12. A sealing material, comprising the curable composition according to claim 8 as a component.

13. An adhesive, comprising the curable composition according to claim 8 as a component.

14. A contact adhesive, comprising the curable composition according to claim 8 as a component.

15. The contact adhesive according to claim 8, comprising the polyether polymer (A) and the polyether polymer (B).

16. A cured product, obtained by curing the curable composition according to claim 8.

* * * * *